(12) United States Patent
Li et al.

(10) Patent No.: US 11,308,654 B2
(45) Date of Patent: Apr. 19, 2022

(54) HEADSET POWER UNIT VISUALIZATION

(71) Applicant: Lenovo (Singapore) Pte. Ltd., Singapore (SG)

(72) Inventors: Scott Wentao Li, Cary, NC (US); Jonathan Co Lee, Cary, NC (US); Jonathan Jen-Wei Yu, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 243 days.

(21) Appl. No.: 16/798,401

(22) Filed: Feb. 23, 2020

(65) Prior Publication Data
US 2021/0264642 A1 Aug. 26, 2021

(51) Int. Cl.
*G06T 11/00* (2006.01)
*G06F 1/28* (2006.01)

(52) U.S. Cl.
CPC ............... *G06T 11/00* (2013.01); *G06F 1/28* (2013.01)

(58) Field of Classification Search
CPC ...................................................... G06T 11/00
See application file for complete search history.

(56) References Cited

U.S. PATENT DOCUMENTS

| 10,884,475 B1 * | 1/2021 | Wang ................. G01R 31/367 |
| 2018/0032125 A1 * | 2/2018 | Peterson ................. G06F 3/012 |
| 2019/0220080 A1 * | 7/2019 | Lehtiniemi ............. G06F 1/163 |

* cited by examiner

*Primary Examiner* — Shivang I Patel
(74) *Attorney, Agent, or Firm* — Brian J. Pangrle

(57) ABSTRACT

A method can include executing an application using a virtual reality headset; rendering a scene of the application to a display of the virtual reality headset; and, during rendering of the scene, rendering a graphic to the display where the graphic represents a power unit that is not physically coupled to the virtual reality headset.

20 Claims, 15 Drawing Sheets

HEADSET POWER UNIT VISUALIZATION

TECHNICAL FIELD

Subject matter disclosed herein generally relates to electronic devices.

BACKGROUND

An electrical device can include electrical components powered via a battery.

SUMMARY

A method can include executing an application using a virtual reality headset; rendering a scene of the application to a display of the virtual reality headset; and, during rendering of the scene, rendering a graphic to the display where the graphic represents a power unit that is not physically coupled to the virtual reality headset. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
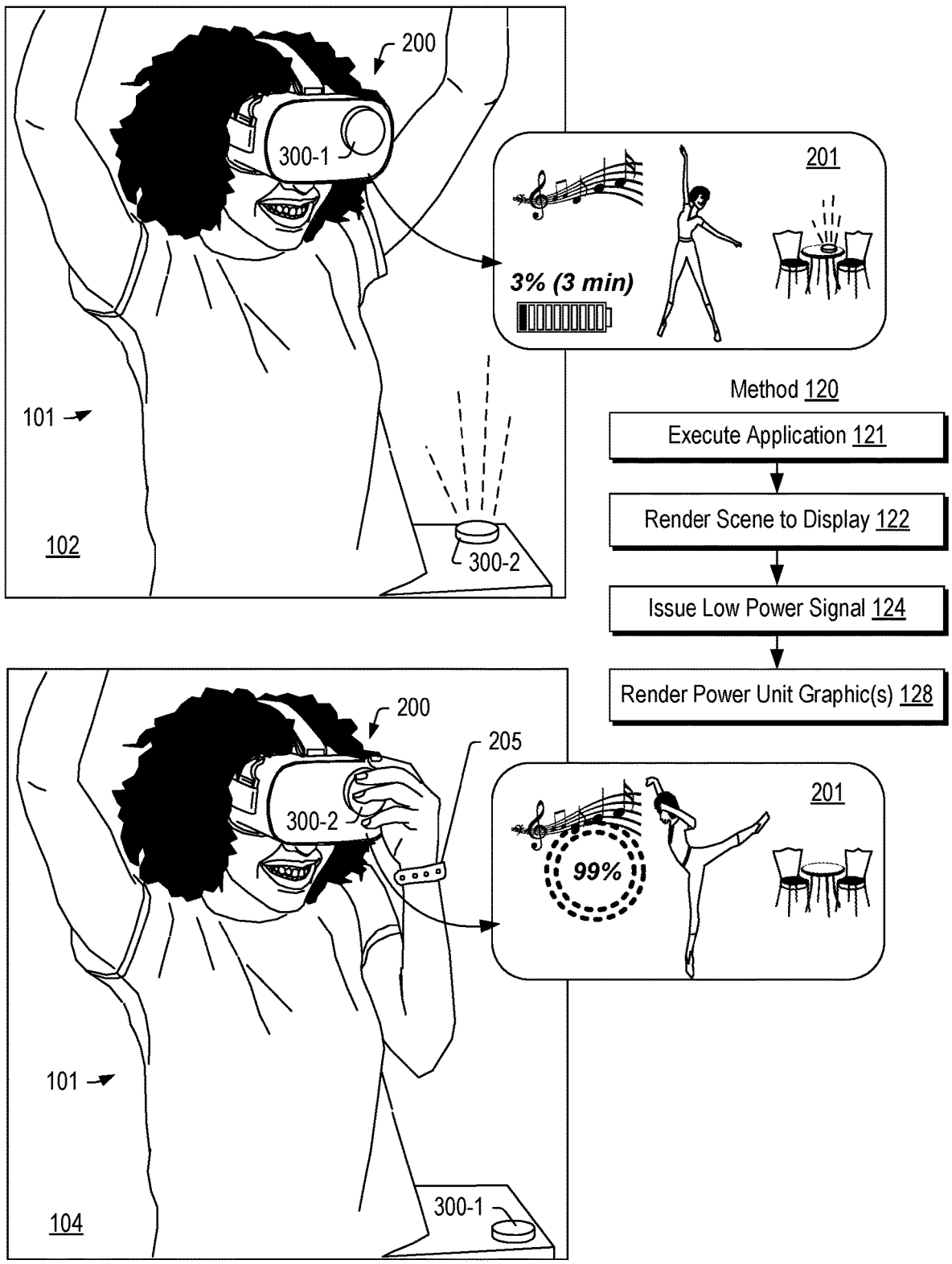
FIG. 1 is a series of diagrams of examples of virtual reality headset use and an example of a method.

FIG. 1 shows a scenario of a user 101 at two instants in time 102 and 104. As shown, the user 101 is wearing a headset 200 that can be supplied with electrical power via a power unit 300-1 or 300-2. The headset 200 can be a virtual reality headset (VR headset). In the instant in time 102, the power unit 300-1 is shown as being physically coupled to the headset 200 while the power unit 300-2 is shown as not being physically coupled to the headset 200.

A VR headset is a head-mounted device that provides virtual reality for a wearer. VR headsets find use with various types of video games; though various VR headset may be utilized for one or more other types of applications such as, for example, simulators, trainers, virtual meetings, etc. A VR headset can include a stereoscopic head-mounted display that can provide separate images for each eye, sound (e.g., stereo, etc.), and motion tracking sensors, which may include one or more of gyroscopes, accelerometers, magnetometers, structured light systems, etc. Various VR headsets include eye tracking sensors. As an example, a VR headset can be operate with one or more accessors such as, for example, a gaming controller, a wand, a wrist tracker, etc.

As an example, a gaming controller can allow a user to interact with a game, which may be a music game, a sports game, a dance game, etc. As an example, a VR system may include components of a full body reading system such as the KINECT system or the PLAYSTATION MOVE system. Such gaming systems use VR to control avatars within a game, where the user's movements can be copied by an avatar, for example, to complete in a game.

As mentioned, various VR headsets are used for training such as, for example, medical training where procedures may be performed in a virtual, controlled environment (e.g., consider students performing surgeries on virtual patients, reviewing surgeries from the perspective of a lead surgeon, etc.).

As an example, a headset may be an augmented reality headset (AR headset). AR technology can provide an interactive experience of a real-world environment where the objects that reside in the real world are enhanced by computer-generated perceptual information, sometimes across multiple sensory modalities, including visual, auditory, haptic, somatosensory and olfactory.

As an example, a VR headset can include features for implementing AR technology. For example, in FIG. 1, the user 101 may experience the power units 300-1 and 300-2, which are real objects, in a VR environment through features of the VR headset 200. In such an example, a power unit may be rendered to a VR headset display using a power unit representation of a physical power unit or a power unit may be rendered to a VR headset display using a representation that differs from that of a physical power unit. As an example, VR headset circuitry, a VR application, etc., may determine how a power unit is to be represented where a representation or representations may be for one or more purposes.

In the example of FIG. 1, the user 101 can see a display 201 of the VR headset 200 where the user 101 appears to be dancing to music, which may be via audio rendered by the VR headset 200 (e.g., or transmitted to one or more speakers, etc.). As to the instant in time 102, the display 201 includes a graphic that indicates that the power unit 300-1 is relatively low (e.g., 3% of full capacity and capable of continuing for approximately 3 minutes). Further, the display 201 provides a scene with the user 101 dancing where the scene also includes objects such as a table and two chairs. As shown, in the display 201 at the instant in time 102, there is an object on the table that is rendered in a manner to attract the attention of the user 101. In the real-world environment of the user 101, at the instant in time 102, the power unit 300-2 is on a table where it may be located by the VR headset 200 using one or more techniques. In such an example, the object on the table in the rendered scene of the display 201 is a representation of the power unit 300-2 such that the user 101 is provided with an indication that the power unit 300-2 exists and is available for use.

At the instant in time 104, the user 101, who may be wearing a VR headset accessory bracelet 205, is replacing the power unit 300-1 with the power unit 300-2 such that the user 101 can continue playing the dance game. As shown in the display 201, at the instant in time 104, one or more graphics are rendered to guide the user 101 in positioning of the power unit 300-2 with respect to the VR headset 200. Such an approach may utilize features of the power unit 300-2 and/or features of the bracelet 205, either or both of which may be located using features of the VR headset 200. As shown, the display 201 may render a graphic such as a circle that corresponds to a socket position of the VR headset 200 suitable for docking the power unit 300-2. As an example, information such as state of charge, etc., may be rendered to the display 201 (e.g., and/or audibly) such that the user 101 knows that the power unit 300-2 has a greater remaining charge than the power unit 300-1. In such an example, an estimated time may be rendered such that the user 101 knows how much longer she can dance with the dance application as executed by the VR headset 200, which can overall improve the experience of the user 101 (e.g., such that the game does not end in an undesirable manner, etc.).

In the example of FIG. 1, the display 201 shows the object that had been rendered as being on the table in the scene as no longer being present. That may provide an indication to the user 101 that no more power units are available for use. As an example, a game may render graphics that guide a user to charge a power unit. For example, consider a charger on the table in the real-world environment where such a charger can be represented in the VR environment as rendered to the display 201. In such an example, the graphics may guide the user 101 to position the power unit 300-1 for charging (e.g., using wireless, wired, etc., technology) such that the power unit 300-1 can be charged and subsequently available for use.

The example of FIG. 1 does not show an instant in time where the user 101 removes the power unit 300-1, which is shown as being placed on the table in the real-world environment at the instant in time 104. As an example, a VR headset may include features for guiding a user for removal of a power unit and, as explained, optionally positioning a removed power unit for charging.

In the example of FIG. 1, the user 101 can enjoy the dance game with minimal interruption. As an example, the VR headset 200 may include a power supply that can provide power to circuitry thereof for an instant in time where a removable power unit is not coupled to the VR headset 200. For example, consider capacitor circuitry that can supply power for a period of time of at least approximately one minute. As another example, consider a lithium-ion battery that can be charged using a power unit and that can supply power for a period of time of at least approximately one minute.

As an example, an application may include a scene that integrates a power unit replacement. For example, consider the dance game as shown in FIG. 1 where the power unit 300-2 is a flower with a stem where the actions of the user 101 cause the display 201 to render the flower on the table and the user 101 taking the flower and holding it by the stem in the mouth of the user 101, where, in actuality, the power unit 300-2 is taken from the real-world table and positioned on the VR headset 200 (e.g., a position that may be proximate to the mouth of the user 101). In such an example, a relatively seamless power unit replacement occurs that is not disruptive to the application but rather an additional feature (e.g., an interactive feature) of the application that allows the application to continue execution and the user to continue enjoyment of the application (e.g., game, etc.).

In the example of FIG. 1, a method can include executing an application using the VR headset 200; rendering a scene of the application to the display 201 of the VR headset 200; and, during rendering of the scene, rendering a graphic to the display 201 where the graphic represents the power unit 300-2 when it is not physically coupled to the VR headset 200. In such an example, as explained, the user 101 may be guided by the graphic, a series of graphics, etc., to properly position the power unit 300-2 for physical coupling to the VR headset 200 such that the VR headset 200 can be powered by the power unit 300-2.

In the example of FIG. 1, the VR headset 200 can be a standalone VR headset where, for example, "standalone" can mean cordless or self-contained. As shown, the VR headset 200 is strapped to the head of the user 101 without any cords coupled to a game box, etc. Such an approach may allow the user 101 to move relatively freely in a real-world environment, without being tethered by a physical cord (e.g., a power cable, an information cable, etc.).

As an example, the VR headset 200 may be configured with one or more power unit sockets that provide for orientation agnostic coupling of a power unit. In such an example, the user 101 may expeditiously replace the power unit 300-1 with the power unit 300-2 while not having to precisely orient the power unit 300-2 with respect to a power socket.

FIG. 1 also shows an example of a method 120 that includes an execution block 121 for executing an application using the VR headset 200; a render block 122 for rendering a scene of the application to the display 201 of the VR headset 200; an issuance block 124 for issuing a low power signal, and a render block 128 for rendering one or more power unit graphics to the display 201 of the VR headset 200. In such an example, the one or more graphics can include a graphic that represents or graphics that represent the power unit 300-2 when it is not physically coupled to the VR headset 200. For example, rendering can provide for one or more graphics that can guide a user to the power unit 300-2 and for positioning the power unit 300-2 with respect to the VR headset 200 such that it may be electrically coupled to the VR headset 200 for powering circuitry of the VR headset 200. In the example method 120, the render block 128 can be responsive to the issuing of a low power signal of the issuance block 124.

As an example, a system can include a VR headset and one or more power units where the system may provide for orientation-less power unit coupling. For example, the power units 300-1 and 300-2 may be orientation-less power units where one or more of angular orientation, side orientation, etc., may provide for orientation agnostic(s).

As an example, a standalone VR headset can include onboard rendering hardware (e.g., consider one of the OCULUS headsets such as QUEST, GO, etc.). A standalone headset can be portable and suitable for use in indoor environments and/or outdoor environments (e.g., in the woods, at a beach, etc.).

As to portability, a VR headset can include a single internal battery unit, which may limit a user session. For example, consider a single internal battery unit that limits a user session to around 2 hours as hardware can be relatively "power hungry" and may demand active cooling as electrical energy is converted into heat energy.

While the single internal battery unit may be detachable upon opening a VR headset to access a battery compartment, such an approach involves removing the VR headset from a user's head and, through the user's own eyes, visually guiding the user's own hands to make the swap. Further, during such a swap, the VR headset is powered down (e.g., a no power state). As such, to resume use (e.g., a session), a user has to reboot the VR headset, which performs various system checks, etc., as it loads instructions, makes connections to accessories, etc. Such a swap is generally a two-handed process, if not more (e.g., consider a user supporting the VR headset between the knees, etc.). Such a swap interrupts a user's immersive VR experience and may even interrupt experiences of others where multiple users are involved in a VR experience (e.g., a multiplayer game, a leader of a training session, etc.).

As explained, a method such as the method 120 of FIG. 1, which can utilize equipment such as the VR headset 200 and the one or more power units 300-1 and 300-2, can minimize interruption of a VR immersive experience and/or enhance a VR immersive experience (e.g., by integrating a power unit into a game, etc.).

In the example of FIG. 1, the user 101 can perform the replacement with a single hand while the other hand may still be actively involved in an application's VR experience and/or where the hand performing the replacement may still be actively involved in an application's VR experience (e.g., consider the flower example).

As explained, a system can be mechanically configured to provide for single handed power unit replacement operation. As an example, depending on application integration, a two-handed replacement may be utilized (e.g., picking up a power unit as if it were a special vessel filled with nourishing energy fluid). As yet another example, consider a replacement that is "no handed" where a user may be guided to bring the VR headset 200 into contact or close proximity with a power unit where the power unit may be subjected to magnetic force and "snap" onto the VR headset 200. For example, consider a scenario where the user 101 bends over the table guided by rendered graphic(s) such that a portion of the VR headset 200 is brought into contact with or close proximity to the physical power unit 300-2. As an example, the VR headset 200 may include multiple coupling locations or, for example, a single coupling location where the physical power unit 300-2 does not replace the physical power unit 300-1 but is attached as an auxiliary power unit that is auxiliary to an internal battery unit. As mentioned, a coupling mechanism may be physical via a connector (e.g., a plug and a socket, etc.) and/or via magnetic force.

As an example, a VR headset can render one or more graphical user interfaces (GUIs) during runtime that allow a user to readily locate one or more power units without removing the VR headset from the user's own head.

As shown in the example of FIG. 1, the power units 300-1 and 300-2 may be circular such that various symmetries exist. As an example, a power unit may be of a different geometry. For example, consider a spherical power unit that can have various symmetries such that it can provide for coupling in a plurality of different orientations.

As an example, a system can include features that provide for coupling a power unit to a VR headset and/or replacing a power unit of a VR headset where a user does not see the power unit; rather, the VR headset can render a representation of the power unit and/or one or more associated graphics to a display such that the user can guide a power unit for coupling to the VR headset. As an example, a process can be a "blind" process in that a user can perform the process without using human vision outside of the confines of a VR headset. For example, in FIG. 1, the eyes of the user 101 are not visible and the user 101 can complete a coupling process using a single hand without being able to see anything outside of what is rendered to the display 201 of the VR headset 200.

As explained with respect to FIG. 1, a system can include one or more accessories such as, for example, the bracelet 205, which may be utilized in combination with locators of the power unit 300-2 to guide a hand of the user 101 to the power unit 300-2 and, for example, to guide the hand of the user 101 to position the power unit 300-2 for coupling to the VR headset 200.

As to making an electrical power connection, a VR headset and a power unit can include various features, which may have certain symmetry to facilitate orientation agnostic coupling.

As an example, a power unit can include one or more active and/or passive components (e.g., IR reflector, emitter, detector, etc.), which may provide for transmission of one or more types of signals from the power unit to a VR headset. In such an example, a VR headset can locate a power unit or power units and where, for example, signals may provide information (e.g., as to status of a power unit or statuses of power units), such information may be utilized in making one or more types of decisions, rendering one or more types of information to a display of the VR headset, rendering one or more types of information via speakers, rendering one or more types of information via one or more haptic transducers, etc.

Figure 2:
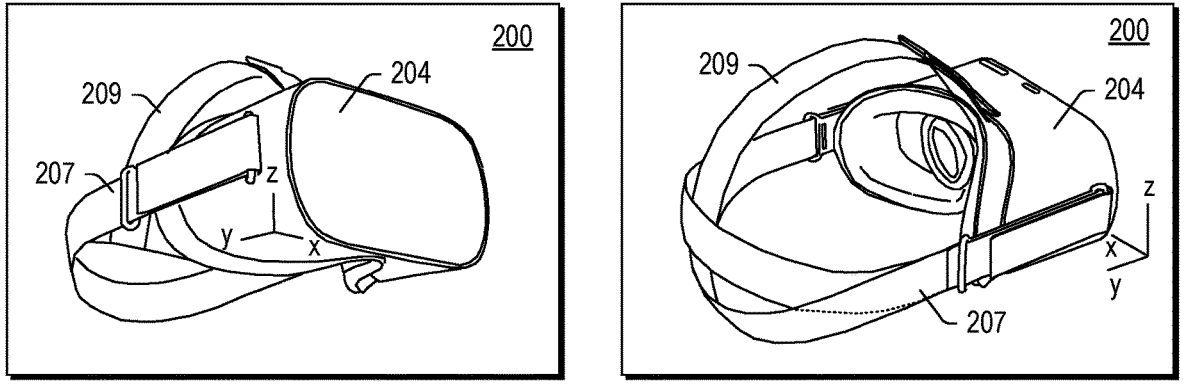
FIG. 2 is a diagram of various examples of VR headsets and examples of power units.
Figure 2:
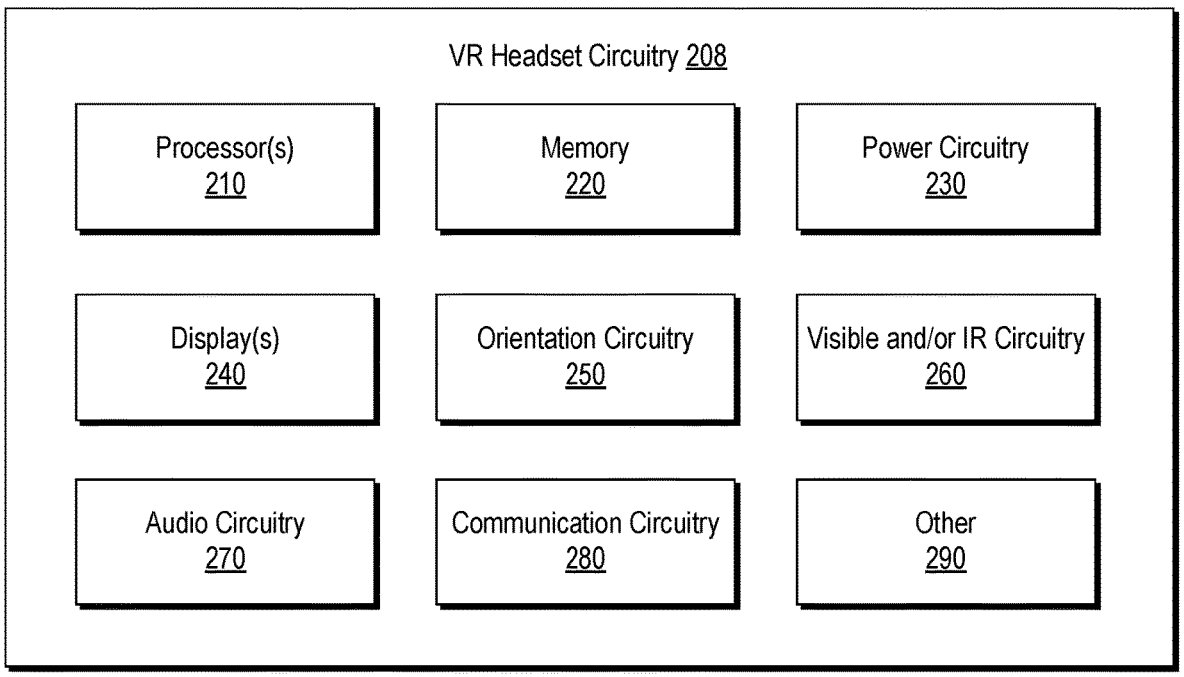
Figure 2:
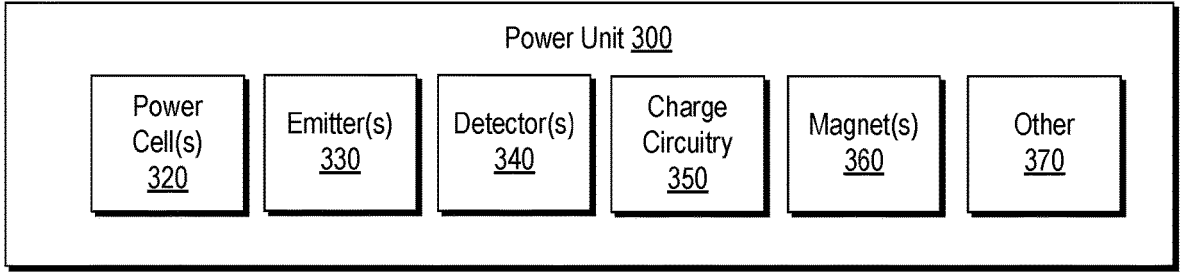

FIG. 2 shows examples of perspective views of the example VR headset 200 of FIG. 1, examples of VR headset circuitry 208 and examples of components of the power unit 300. As shown, the VR headset 200 can include a body 204 and one or more straps 207 and 209. As shown, the one or more straps 207 and 209 can be utilized to secure the body 204 to a user's face where the user's eyes are aligned with ocular assemblies of the body 204. The body 204 can include one or more control features such as, for example, one or more buttons, one or more touchpads, etc.

As an example, the VR headset 200 may be described with respect to one or more coordinate systems. For example, consider a Cartesian coordinate system (x, y, z) where the body 204 includes a surface substantially in an x,z-plane that is substantially parallel to a facial plane of a user's face. In such an example, the VR headset 200 extends in the y direction with various features such as contoured features that can conform to a user's face. As shown, the strap 207 can be a head strap that has a U-shape to fit around a user's head (e.g., with ends coupled to the body 204). As shown, another strap 209 can be a crown strap that extends above the crown of a user's head and that may join the strap 207. As an example, a cylindrical coordinate system and/or a spherical coordinate system may be utilized, for example, consider modeling a user's head as an upright cylinder and/or a user's head as a sphere where the VR headset 200 can be mounted to the user's head and described in one or more coordinate systems (e.g., Cartesian, cylindrical, spherical, etc.). As an example, a yaw, pitch and roll coordinate system may be utilized such as, for example, in aircraft, where a user wearing the VR headset 200 may cause the VR headset 200 to roll (e.g., rotation about an axis defined by a user's nose), to pitch (e.g., rotation about an axis defined by a user's ears) and/or to yaw (e.g., rotation about an axis defined by a user's cervical vertebra). As an example, a scene may include a "fixed" coordinate system (e.g., of a room, etc.) where a user can change orientation in the fixed coordinate system. In such an example, a VR headset 200 may include circuitry that can define a fixed coordinate system (e.g., using walls, ceiling, floor, etc.). As an example, a system that includes a VR headset and one or more power units may provide for tracking a power unit with respect to the VR headset such that, for example, a user can maneuver the power unit to a proper position with respect to the VR headset where such maneuvering can be guided by the VR headset (e.g., via rendering one or more graphics, via audio signals, via tactile signals, etc.).

In the example of FIG. 2, the VR headset circuitry 208 can include one or more processors 210, memory 220 accessible to at least one of the one or more processors 210, power circuitry 230, one or more displays 240, orientation circuitry 250, visible and/or infrared (IR) circuitry 260 (e.g., as locating circuitry, etc.), audio circuitry 270, communication circuitry 280 and optionally one or more other types of circuitry 290.

As an example, the one or more displays 240 may include two OLED displays with a combined resolution in excess of 1000×600, with a suitable refresh rate in excess of approximately 30 Hz. As an example, the orientation circuitry 250 can include one or more of an accelerometer, a gyroscope, and a magnetometer. As an example, the visible and/or IR circuitry 260 can include one or more IR emitters, one or more IR detectors, one or more visible wavelength detectors, etc. As an example, the audio circuitry 270 can include one or more speakers (e.g., earphone speakers) and/or one or more wireless transmitters (e.g., BLUETOOTH, etc.).

As an example, a VR headset can include circuitry such as a TOSHIBA TC358870XBG 4K HDMI to MIPI dual-DSI converter, a CYPRESS CYUSB3304 USB 3.0 hub controller, a ST MICROELECTRONICS STM32F072VB ARM CORTEX-M0 32-bit RISC core microcontroller, a WINBOND W25Q64FVIG 64 Mb serial flash memory, a NORDIC SEMICONDUCTOR nRF51822 BLUETOOTH smart and 2.4 GHz system on a chip (SoC), a CMEDIA CM119BN USB audio controller, a BOSCH SENSORTEC BMI055 6-axis inertial sensor, multiple TEXAS INSTRUMENTS TLC59401 16-channel LED driver with dot correction and grayscale PWM control, etc.

As an example, a VR headset can include one or more of a QUALCOMM SNAPDRAGON processor, SK HYNIX SRAM, a heat sink, a battery such as, for example, a 18650 battery format 2600 mAh battery, a microphone, an antenna, etc. As to the 18650 battery format, it can be approximately 65 mm (2.56 in) long or may be approximately 68 mm (2.68 in) long with an internal protection circuit (e.g., longer than an AA format battery).

As an example, a VR headset can include one or more features of the OCULUS GO VR headset. As an example, a VR headset can include a QUALCOMM SNAPDRAGON 821 SoC, 3 GB of LPDDR4 RAM, 32 GB or more of internal storage, an integrated ADRENO 530 GPU (e.g., approximately 500 GFLOPS of graphics performance), a 2600 mAh battery, non-positional three-degrees of freedom tracking, one or more proximity sensors, an accessory controller, a 5.5-inch LCD display with a 2560×1440 (1280× 1440 pixels per eye) resolution in an RGB-stripe subpixel arrangement, a field of view of approximately 100 degrees (e.g., a horizontal pixel density of approximately 12.67 pixels per degree), and Fresnel lenses.

As an example, a controller may be a wireless controller that can be an orientation-tracked remote controller with pointer capabilities that can interact with applications. As an example, a controller can include a touchpad, one or more buttons, a battery (e.g., an AA format battery, etc.), etc.

As an example, the VR headset circuitry 208 and/or other system circuitry can provide for tracking such as tracking a power unit or power units. As an example, tracking can include locating a power unit or power units.

As an example, various techniques may be utilized for locating, tracking, etc. For example, consider one or more of controller-based and non-controller based hand tracking techniques where a hand tracking feature may enable the use of a hand or hands for input, optionally integrated with power unit locating circuitry.

As an example, the VR headset circuitry 208 can include simultaneous localization and mapping (SLAM) circuitry, which may provide for constructing and/or updating a map of an environment while keeping track of a VR headset wearing user's location within the environment. As an example, the VR headset circuitry 208 can include one or more OPTITRACK cameras (e.g., SLIM 13E, etc.), which may be utilized with one or more OPTITRACK tags (e.g., active, passive, active and passive, etc.). For example, a power unit may include a circuitry tag that can include one or more LEDs that can emit pulses detectable by camera circuitry. As an example, a camera can include features for IR and/or visible spectrum imaging, optionally with switching, one or more band-pass filters, etc.

In the OCULUS QUEST VR system, options exist for: Controllers Only where there is no hand tracking permission added in the manifest file; Controllers and Hands where controllers and hands are supported for input; and Hands Only where usage of hands can occur.

In the OCULUS QUEST VR system, OVR Mesh Renderer renders hands by combining data returned by OVR Skeleton and OVR Mesh. A method can include selecting the OVRHandPrefab prefab to configure the following settings: OVR Skeleton exposes data such as the skeleton bind pose, bone hierarchy, and capsule collider data where, in the Skeleton Type list, a selection for a hand for which retrieving the data can be made (e.g., hand left or hand right); OVR Mesh handles loading a specified 3D asset from a runtime and exposing it as a UnityEngine.Mesh where the mesh can be configured with attributes such as vertices, uvs, normals, and bone weights and where, in the Mesh Type list, a selection for the hand for which retrieving the data can be made; and OVR Mesh Renderer, which combines the data returned by OVR Skeleton and OVR Mesh to generate the animated 3D model of hands.

As an example, a VR headset can include one or more types of tracking circuitry, which can provide for locating one or more objects and changes in location of one or more objects. As an example, a VR headset can include one or more types of camera circuitry, for example, for locating one or more objects. As an example, camera circuitry may provide for locating using one or more of a range of wavelengths, which can include, for example, infra-red (IR) wavelengths and/or visible wavelengths. As an example, a power unit can include an IR emitter or IR emitters such that camera circuitry can locate the power unit. In such an example, one or more features may be utilized for purposes of rendering a scene that includes a visual representation of a power unit.

As to dimensions of a VR headset, consider, as an example, dimensions of approximately 190 mm×105 mm×115 mm (7.48 in×4.13 in×4.53 in) and, for example, a mass of approximately 468 g (1.032 lb).

As an example, a VR headset can be associated with a software development kit (SDK). As an example, a VR headset can include tracking sensor circuitry, which may include programmable instructions (e.g., firmware, software, etc.). As an example, a VR headset can include communication circuitry that can be operatively coupled to the Internet, for example, for virtual reality content to be downloaded and rendered.

In the example of FIG. 2, the power unit 300 can include one or more of the following: one or more power cells 320, one or more emitters 330, one or more detectors 340, charge circuitry 350, one or more magnets 360 and one or more other types of circuitry 370.

As mentioned, a power unit can include reflectors and/or emitters that can provide for transmissions of signals that can be received by circuitry of a VR headset such that a power unit can be detected. As mentioned, a power unit may transmit information as to its status, which may be an automated transmission (e.g., pings, etc.) and/or transmission in response to a signal (e.g., pings, etc.). As an example, during execution of a VR application by a VR headset, the VR headset may be aware of one or more power units.

Figure 3:
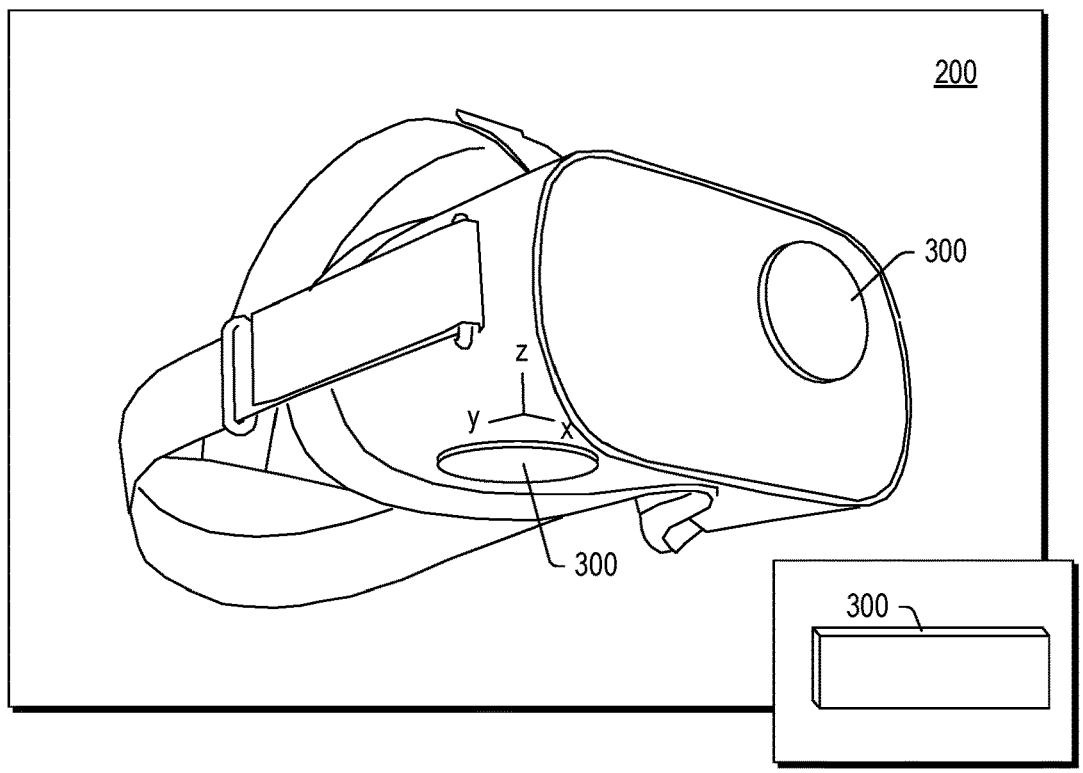
FIG. 3 is a series of perspective views of examples of VR headsets and examples of power units.
Figure 3:
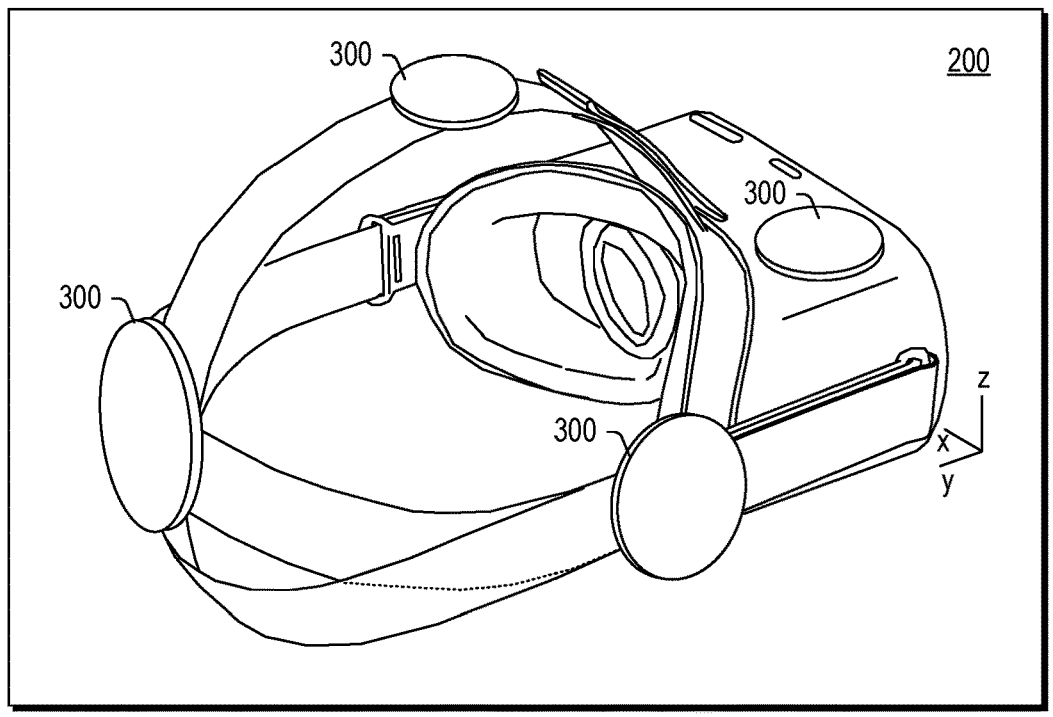

FIG. 3 shows two perspective views of the example VR headset 200 along with various examples of positions of an example of a power unit 300. For example, consider a front position, a bottom position, a top position, a side position, a strap position, etc. Where a position is a strap position, a strap can include one or more conductors that provide for transmission of power from a power unit to circuitry of a VR headset. FIG. 3 also includes an inset of a power unit 300 with a form factor that is other than disc shaped (e.g., rectangular, etc.). In the examples of FIG. 3, the positions may be described with respect to one or more coordinate systems such as, for example, the shown Cartesian coordinate system. For example, consider a position that is in an x,z-plane, a positon that is in an x,y-plane, a position that is in a y,z-plane, etc. Such positions may be "familiar" to a user and understandable to be, for example, parallel to an eye plane, parallel to an ear plane, at the back of a user's head, at the crown of a user's head, etc., which may be anatomical places that a user is accustomed to touching by hand, even with eyes closed, in the dark, etc. Where a position is "familiar", one or more types of renderings by a VR headset may be utilized to sufficiently guide the user to a location, optionally with rendering graphics, audio, etc. For example, consider a "crown of head" or "top of head" instruction being rendered to guide a user, which may be accompanied by a graphic representing a power unit being rendered.

In the examples of FIG. 3, the size and shape of the power unit 300, as mentioned, are given as examples. As explained, a power unit may include one or more symmetries such that multiple orientations are possible for coupling of a power unit to a VR headset, which can relax demands for user positioning and/or VR headset rendering to successfully guide a user in maneuvering a power unit.

As an example, a power unit can be a hand-holdable power unit that is relatively low in mass (e.g., less than the mass of a VR headset) and positionable on a VR headset in a manner that does not "unbalance" the VR headset (e.g., with respect to as strap, etc., such that the VR headset shifts position on a user's head). As an example, a power unit can have a maximum dimension that is less than approximately 25 cm (e.g., less than 10 inches). As an example, a power unit can have a maximum dimension that is less than approximately 12.5 cm (e.g., less than 5 inches). For example, consider a disc shaped power unit that has a maximum diameter that is less than approximately 12.5 cm. As an example, where a VR headset includes a front surface (e.g., a substantially planar surface as in various examples of FIG. 3), a power unit may have a surface area of a mating surface that is less than the surface area of the front surface. As an example, a power unit may be shaped as a cylindrical disc with a diameter of less than approximately 15 cm and a thickness less than approximately 15 cm. As shown in FIG. 3, a power unit may have a shape other than a cylindrical disc.

Figure 4:
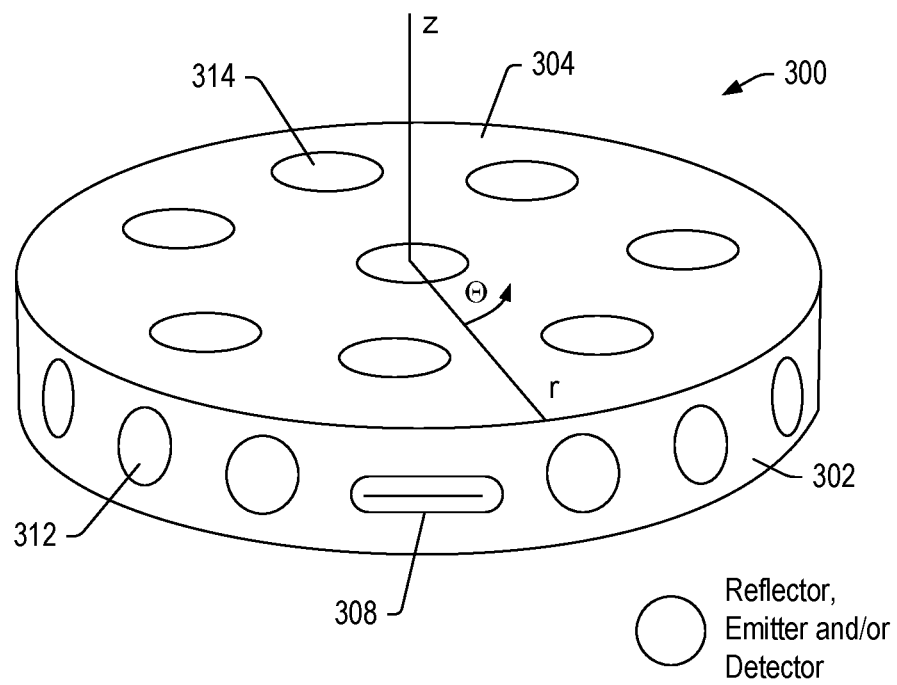
FIG. 4 is a series of perspective views of examples of power units.
Figure 4:
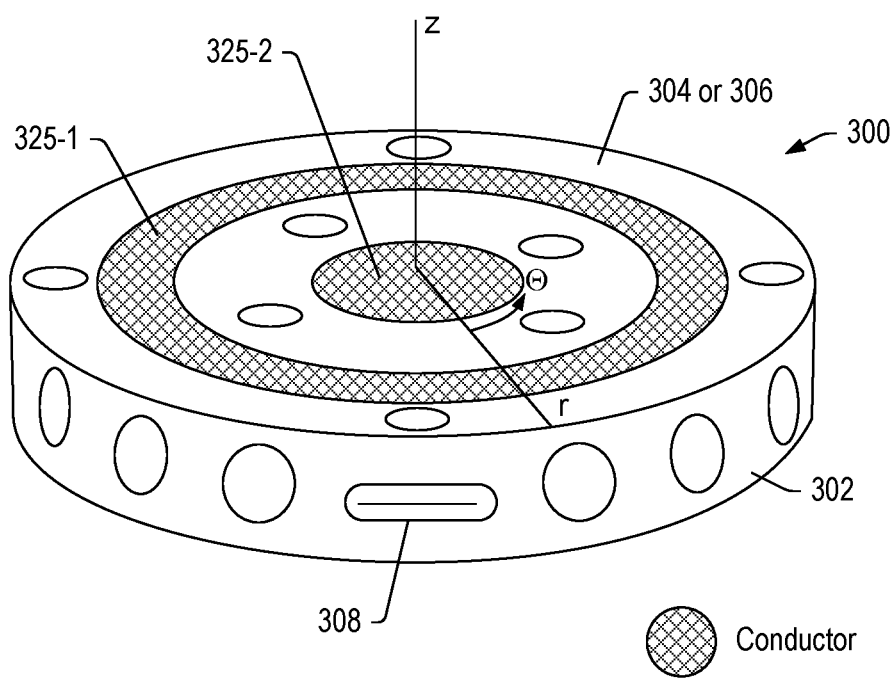

FIG. 4 shows two perspective views of examples of a power unit 300. As shown, the power unit 300 may be disc shaped and can include a side 302, a top 304 and a bottom 306. As shown, the power unit 300 may include a port such as, for example, a USB port or other type of data and/or power port (e.g., for data transfer, charging, etc.). In the examples of FIG. 4, the power unit 300 is shown with respect to a cylindrical coordinate system (r, z, Θ), which may be utilized to describe one or more features, including, for example, one or more symmetries and/or asymmetries.

In the example of FIG. 4, the power unit 300 can include one or more reflectors, emitters and/or detectors 312 and 314 and can include one or more conductors 325-1 and 325-2. As an example, the top 304 and the bottom 306 may be the same in terms of features such as the conductors 325-1 and 325-2, which may provide for orientation agnostics. For example, where the top 304 and the bottom 306 include the conductors 325-1 and 325-2, a user may position the power unit 300 for coupling to a VR headset with the top 304 toward the VR headset or with the bottom 306 toward the VR headset. As an example, as to reflectors, emitters and/or detectors, they may have symmetry or asymmetry where, for example, as to asymmetry, it may help to guide a user in positioning with respect to a VR headset. Referring again to the examples of FIG. 3, an r,Θ-plane may be aligned with a x,z-plane or another plane, as appropriate, for coupling a power unit to a VR headset. As an example, symmetry about a z-axis of a power unit may provide for relaxing orientation requirements as to rotational orientation of the power unit about the z-axis. As an example, where a top and a bottom include coupling features, orientation as to top and bottom may be relaxed for coupling a power unit to a VR headset.

Figure 5:
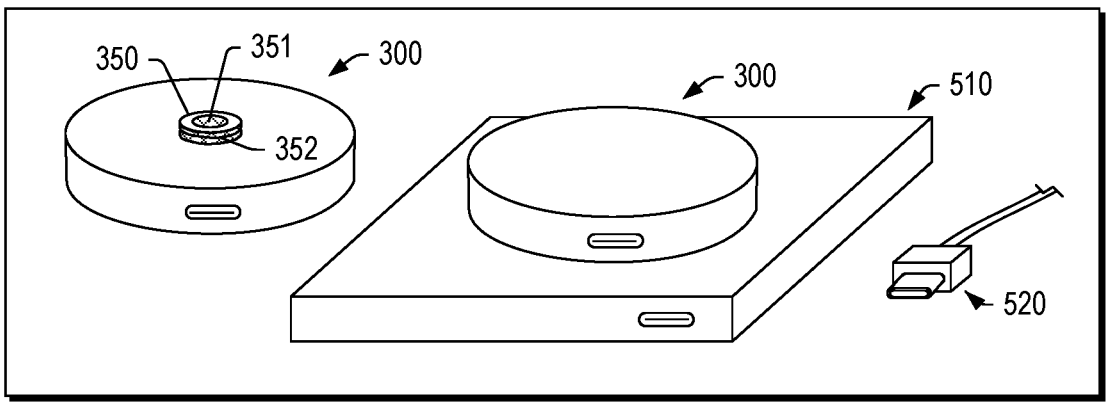
FIG. 5 is a series of diagrams of examples of couplings.
Figure 5:
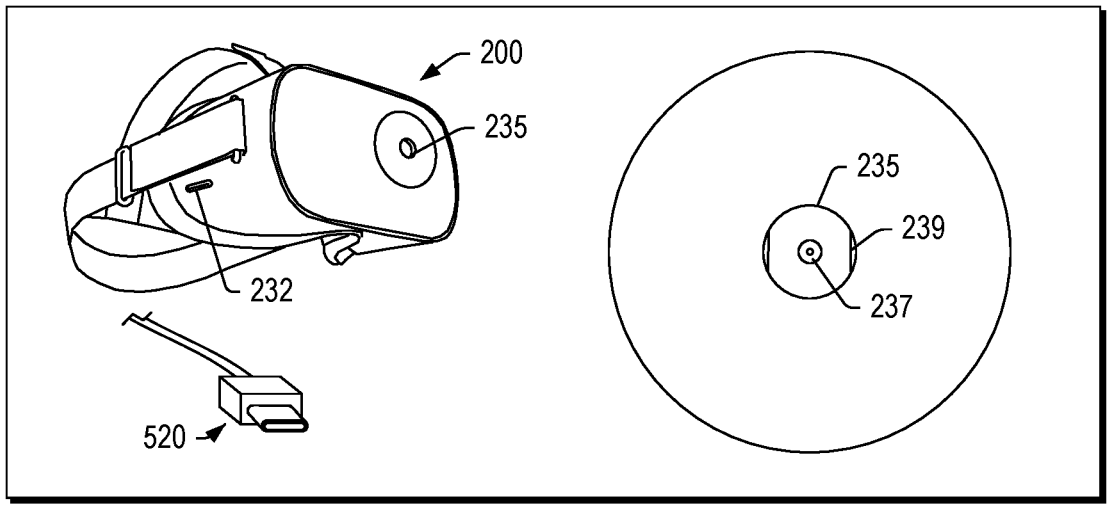
Figure 5:
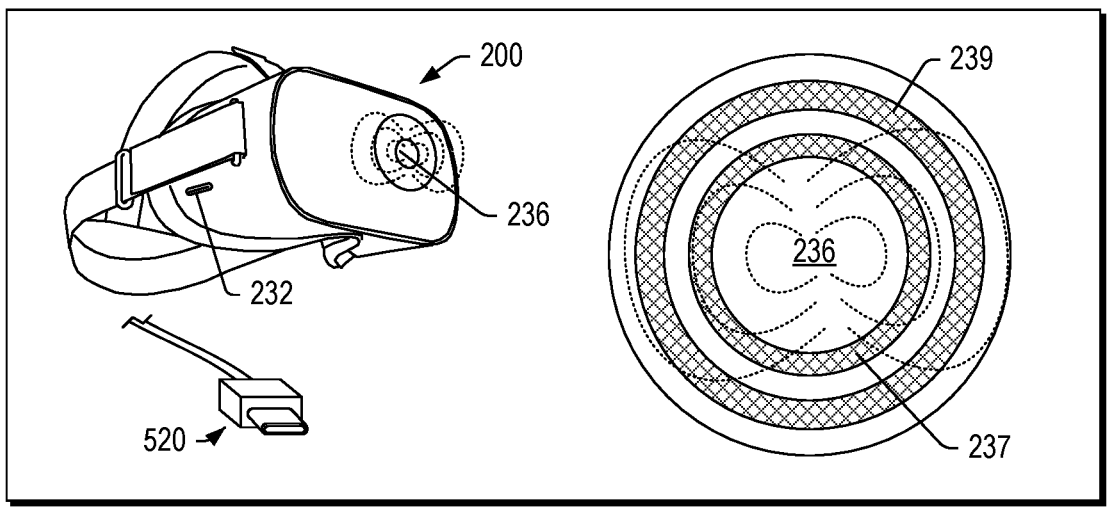

FIG. 5 shows an example of a power unit 300 with a plug 350 that includes conductors 351 and 352 where the plug 350 may be suitable for plugging into a socket such as a socket of a VR headset, a charger, etc. As shown, a charger 510 may be a wired and/or a wireless charger with respect to a power unit. For example, the power unit 300 can include a plug or alternatively a socket for coupling to the charger 510 or the charger 510 and the power unit 300 may include wireless transmission circuitry (e.g., consider the Qi standard, etc.). As shown, a cable or cord can include a connector 520 that may be utilized for power and/or data transmission (e.g., for a power unit and/or for a charger).

FIG. 5 also shows an example of the VR headset 200 with a port 232 and/or a socket 235. In the example of FIG. 5, the port 232 may be a USB port, etc. As to the socket 235, it may be configured with conductors 237 and 239 that can electrically connect with the conductors 351 and 352, respectively, of the power unit 300 as shown with the plug 350. In such an example, the plug 350 can include a valley that can snap into resilient features of the conductor 239, which may help to secure the power unit 300 with respect to the VR headset 200. As shown, the plug 350 and the socket 235 can include symmetry about an axis such that orientation about the axis is not demanded for electrical coupling.

FIG. 5 shows another example where the VR headset 200 can include a magnet 236 and conductors 237 and 239 where a power unit may include a ferromagnetic material and/or a magnet that can be attracted to the magnet 236. As an example, the VR headset 200 can include a ferromagnetic material where a power unit includes a magnet that can be attracted to the ferromagnetic material. As an example, a power unit may be coupled to a VR headset via magnetic attraction (e.g., magnetic force).

Figure 6:
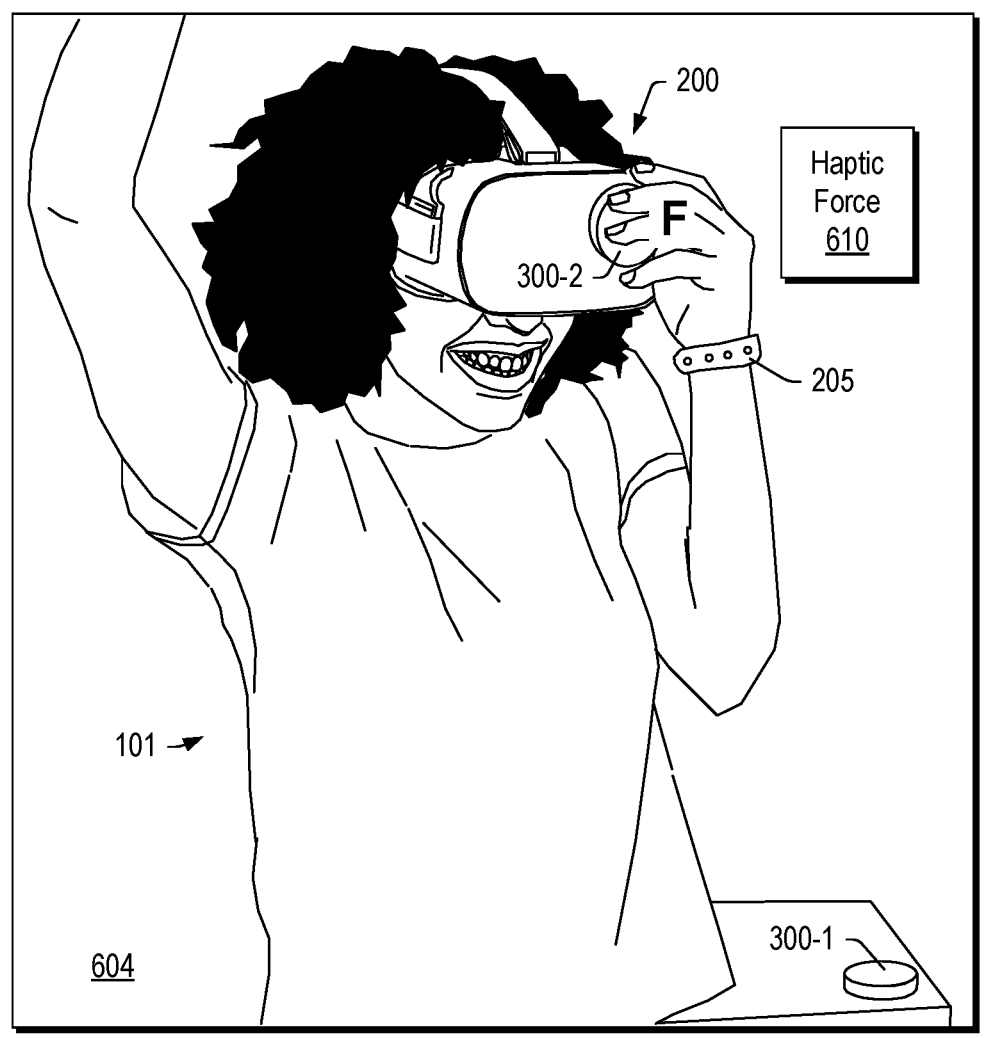
FIG. 6 is a series of diagrams of examples of magnets.
Figure 6:
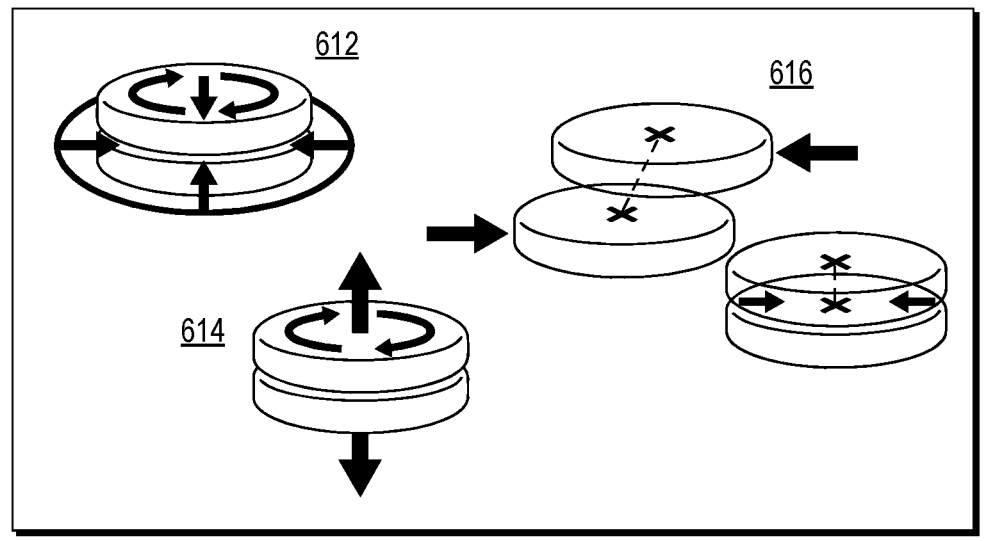

FIG. 6 shows an example scenario 604 where the user 101 experiences a haptic force 610 upon positioning the power unit 300-2 with respect to the VR headset 200. In such an example, the haptic force 610 may be via one or more magnets such as, for example, a detent pairs alignment arrangement 612, a twist latch alignment arrangement 614, or a centering pairs alignment arrangement 616. As an example, a power unit may include a vibrator such as that of a smart phone where the vibrator is actuated to signal a user as to one or more conditions (e.g., touching a power unit, positioning a power unit, power supply of a power unit, etc.).

For example, the arrangement 612 will align at specific angles when rotated and hold its position until enough force is applied to rotate one magnet into the next position, the arrangement 614 will repel until they rotate through the zero-force transition point where they will attract and attach (e.g., they have an alignment pattern that will repel or release the magnets when one magnet is rotated into a specific release orientation), and the arrangement 616 can include matching pairs that will align along a set axis.

As an example, alignment magnets can be multipole encoded magnets that include small magnetic poles encoded into a single face of raw magnet material to create alignment patterns that can produce complex precision alignment.

Figure 7:
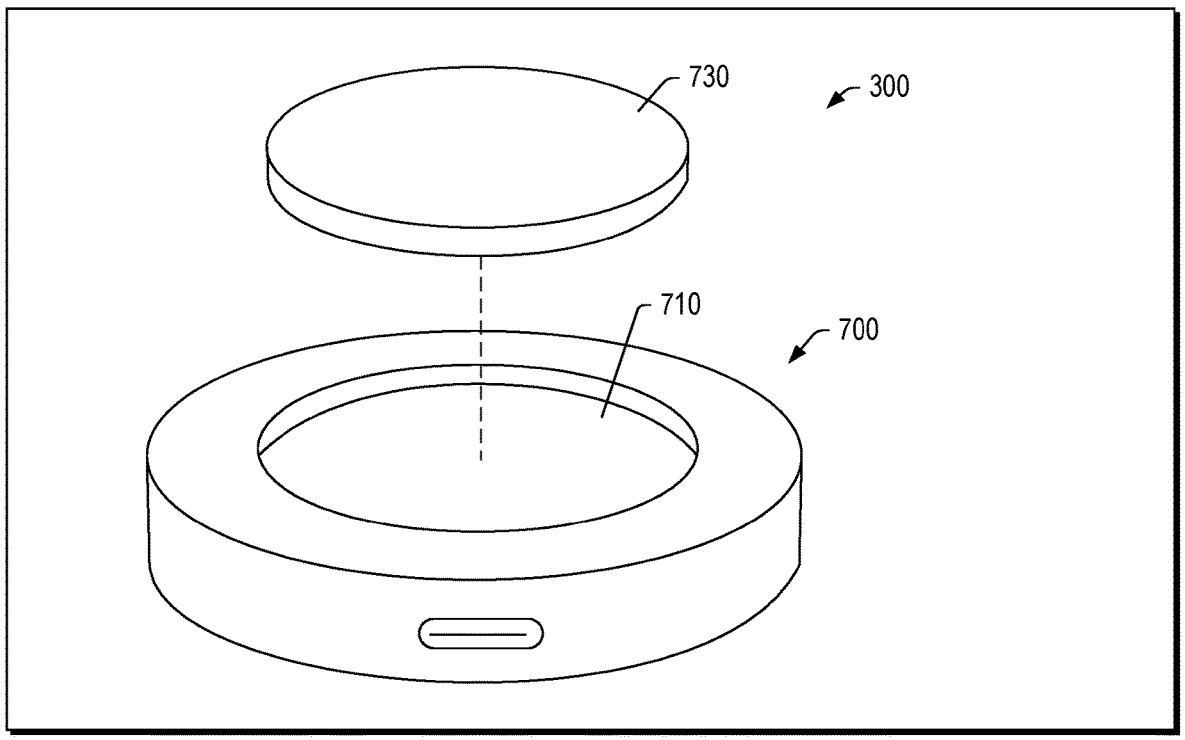
FIG. 7 is a diagram of an example of a power unit.

FIG. 7 shows an example of a power unit 300 that includes a housing 700 and a power cell 730 (e.g., or power cells) that can be received by the housing 700, for example, in a receptacle 710, which can include one or more electrical connectors, etc., for transfer of electrical power from the power cell 730 to the housing 700. As an example, the power cell 730 may include one or more electrical connectors suitable for electrical coupling to a VR headset (e.g., consider an outwardly facing surface as including one or more features such as one or more of the features shown in the examples of FIG. 4. As an example, the power cell 730 may be of a standard format where the housing 700 includes various features for purposes of coupling to a VR headset and, for example, optionally charging, etc.

Figure 8:
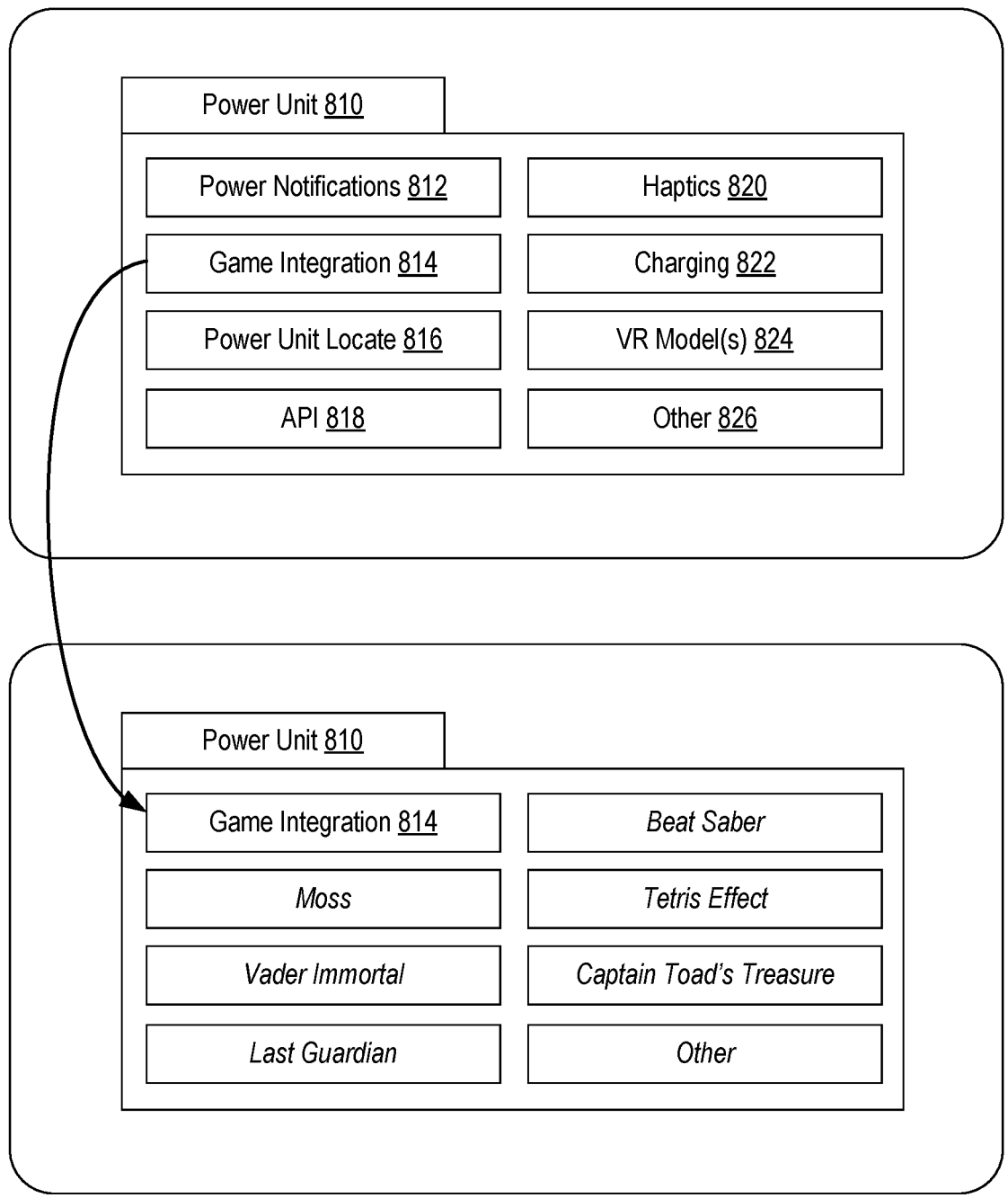
FIG. 8 is a series of diagrams of examples of a graphical user interfaces.

FIG. 8 shows an example of a power unit graphical user interface (GUI) 810 that may be rendered to a display such as the display 201 of the VR headset 200. In such an example, the GUI 810 can include various power unit related menus such as, for example, a power notifications menu 812, a game integration menu 814, a power unit locate menu 816, an application programming interface (API) menu 818, a haptics menu 820, a charging menu 822, a VR model(s) menu 824 and one or more other menus 826. As shown in FIG. 8, the game integration menu 814 may provide for integration of a power unit into one or more game applications where, as mentioned, a power unit may "become" part of a game.

Figure 9:
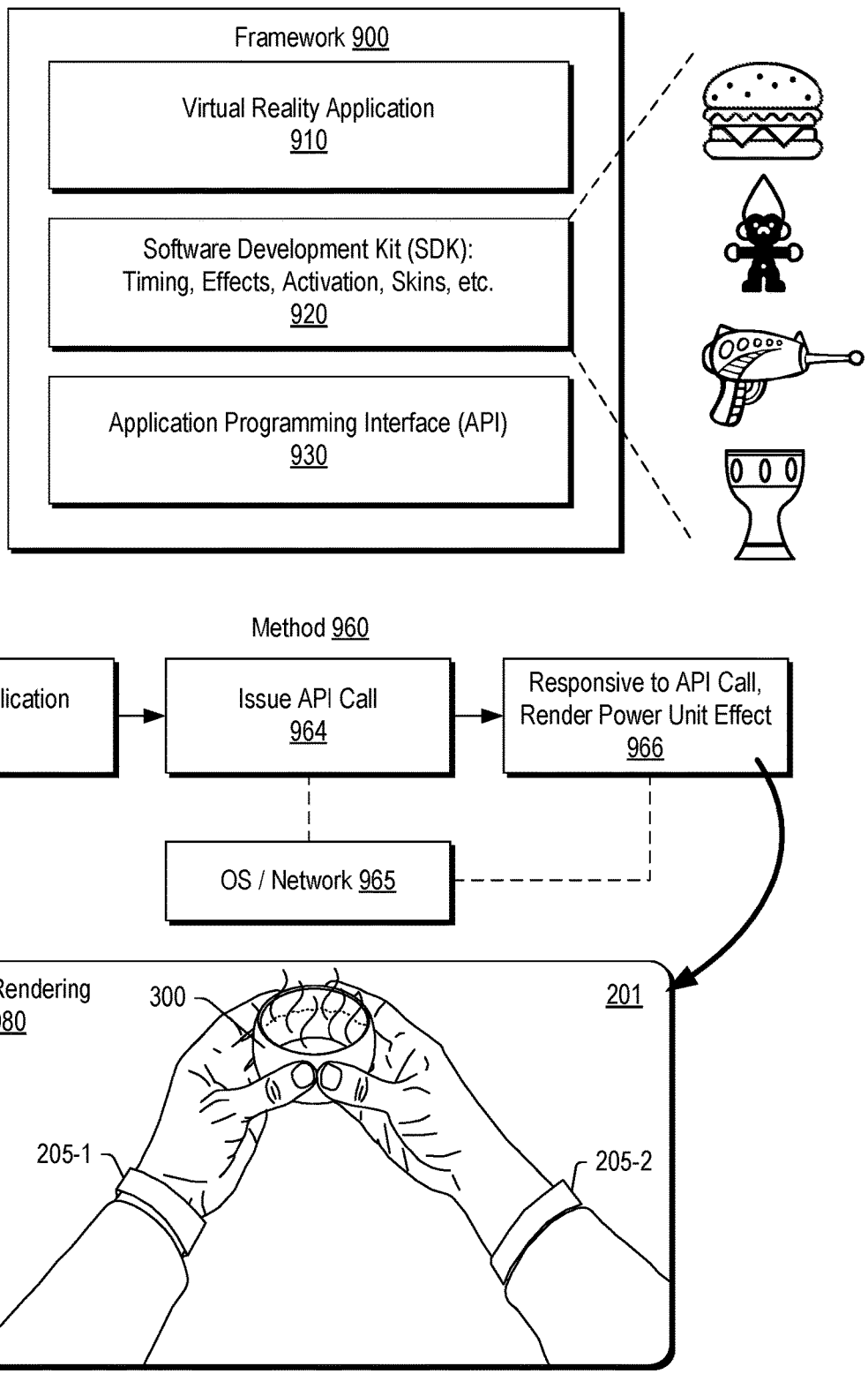
FIG. 9 is a series of diagrams of an example of a framework, an example of a method and an example of a rendering of a power unit effect to a display.

FIG. 9 shows an example of a framework 900, an example of a method 960 and an example of a rendering of a power unit effect 980 to a display 201. As shown, the framework 900 can include a virtual reality (VR) application 910, a software development kit (SDK) (e.g., for timing, effects, activation, skins, etc.) 920, and an application programming interface (API) 930. In the example of FIG. 9, some examples of skins are shown, which include a hamburger (e.g., food), a troll (e.g., friend or foe), a laser pistol (e.g., a tool), and a holy grail (e.g., a game object, a vessel, a container, etc.). As an example, a power unit may be represented as one or more types of entities in a VR environment. As an example, a power unit may be associated with nourishment, a friend or foe, or a tool. As an example, one or more states of a power unit may provide for changes to an entity.

As to the method 960, as shown, it can include an execution block 962 for executing an application, an issuance block 964 for issuing an API call, and a render block 966 for rendering a power unit effect responsive to the API call. As shown, an API call may be via an operating system (e.g., OS environment) and/or a network.

As shown in the example of FIG. 9, the rendering of a power unit effect 980 can include rendering of the power unit 300 with special effects, optionally in a visualization that includes one or more hands of a user, where the user may be fitted with one or more accessories 205-1 and/or 205-2 or not. In the example of FIG. 9, the hands of the user may be real, replicas, animations, etc.

As an example, the rendering of a power unit effect 980 in FIG. 9 may utilize data as to one or more hands and data of a power unit. As explained, hand data may be via an accessory, accessories, or via controller-free hand tracking. As an example, one or more hands and one or more power units may be rendered together where, for example, instructions provide for integrating rendering of one or more hands and one or more power units (e.g., consider the SDK 920, etc.).

In the example of FIG. 9, the rendering 980 to the display 201 shows the power unit 300 as being a vessel with fluid where a VR environment may cause the fluid to move, spill, evaporate, etc. As an example, the fluid may be a proxy for energy stored in a power unit such that if the user tilts, shakes, etc., the fluid may spill out of the vessel and the stored energy may be diminished, which may be achieved via a software limitation as the actual stored energy may be at a "real-world", physical level. In such an example, an energy "delta" can exist between a VR energy level and an actual energy level, which can provide application developers with an opportunity for a user to "gain" back energy through one or more actions, feats, etc. For example, if a user slays the dragon, the power unit 300, which may have been diminished in energy through a game play instruction, may become "re-charged" through another game play instruction where the actual power unit 300 has remaining capacity (e.g., above that of the diminished energy level). In such an approach, an application developer can create incentives for a user to continue game play in a manner that is linked to one or more characteristics of the power unit or power units.

As shown in the example rendering 980, a method can include executing an application using a VR headset; rendering a scene of the application to the display 201 of the VR headset; and, during rendering of the scene, rendering a graphic to the display 201 where the graphic represents the power unit 300 that is not physically coupled to the VR headset. As shown, the graphic can be an effect, which in the example rendering 980 is a vessel (e.g., a holy grail, etc.).

As an example, a power unit can include one or more types of tracking circuitry, motion circuitry, etc. For example, consider emitters that allow for determining whether a power unit is level or tilted and/or consider an accelerometer, a gyroscope, etc., that can allow for determining whether a power unit is level or tilted. In such an example, where the power unit is tilted, an effect may be rendered to a display. For example, in the rendering 980, the effect may be spilling liquid from a vessel or an effect that the user is drinking from the vessel to refresh, energize, etc., the user. In such an example, the drinking effect, being close to a VR headset worn by the user, can include a slight movement of the power unit such that the power unit is operatively coupled to the VR headset (e.g., to provide electrical power to circuitry of the VR headset). In such an example, a user's mouth and a position for coupling a power unit may be in proximity, for example, less than approximately 25 cm (e.g., 10 inches) away from each other. As mentioned, a VR application may cause rendering of one or more graphics, audio signals, etc., to guide a user such that a power unit can be properly positioned with respect to a VR headset.

While the rendering 980 shows a vessel effect for the power unit 300, various other effects may be utilized. For example, consider a "third-eye" where upon coupling of a power unit to a VR headset, an application renders a "third-eye" effect, which may be a scene within a scene such that the user can appear to have special powers, an X-ray vision effect, etc. For example, consider a "third-eye" as being a mystical and esoteric concept of a speculative invisible eye, usually depicted as located on the forehead, which provides perception beyond ordinary sight. In such an example, an application developer can associate a power unit with such concepts, optionally linking energy level of the power unit to abilities (e.g., "third-eye" abilities). For example, consider diminishing abilities as energy level diminishes, which may be a prompt for a user to search for (e.g., locate) another power unit (e.g., another "third-eye").

As an example, a system may provide for determining orientation of a power unit for one or more purposes. For example, a purpose may be to guide the power unit to an appropriate position for operatively coupling the power unit to a VR headset and/or to render effects to a display of the VR headset. While rendering of visual effects are illustrated in the example of FIG. 9, one or more other types of sensory effects may be rendered, actuated, etc. For example, consider vibration, sound, etc.

As an example, during execution of an application, a VR headset and/or one or more accessories may acquire information concerning a power unit or power units. In such an example, the acquisition of information may optionally be via one or more types of calls (e.g., API calls, pings, etc.). For example, consider a game application that is aware of remaining capacity of a power unit operatively coupled to a VR headset such that the game application can issue a call to one or more other power units, for example, to "wake-up", transmit energy level, etc. In such an example, the game application may execute a scene directed to one of the power units such that the user seamlessly plays the game optionally without knowledge as to why the scene is leading the user to an "object" that is the one of the power units. In such an example, a VR headset and the game application may track, interact with, etc., the one of the power units. For example, consider orientation circuitry of the power unit being active and transmitting information to the VR headset for consumption by the game application where, in turn, the game application can render an object (e.g., a skin, etc.) representing the power unit based at least in part on the information. As mentioned, such rendering can be for one or more purposes (e.g., game play by integrating the power unit into a game, extending game play by operatively coupling the power unit to a VR headset, etc.).

As mentioned, one or more accessories may be utilized, in an active and/or passive manner, to provide for integration of a power unit into a scene, etc. For example, in the rendering 980 of FIG. 9, the accessory 205-1 may allow for locating the user's left wrist, the accessory 205-2 may allow for locating the user's right wrist, and the power unit 300 may allow for locating itself such that the hands extending from the wrists can be guided in a VR rendering toward the power unit 300. As an example, a power unit may be touch-sensitive where, upon touching by a human hand, it can issue a signal that can be received by a VR headset. Or, for example, consider a portion of a hand covering a reflector, an emitter, a detector, etc., of a power unit such that blocking occurs, which may be an indication that the power unit has been contacted by at least one hand of a user.

As an example, a system can include circuitry that can determine when a user has contacted a power unit. In such an example, the system can perform one or more actions responsive to such contact. For example, an action may be a game play action and/or a guiding action. As explained, headset power unit visualization can enhance one or more aspects of a VR user experience. As an example, such technology may be implemented in a multi-user scenario, for example, where multiple users aim to access a replacement power unit. In such an example, a power unit may become part of a multiple player game such that each player sees the power unit in a particular manner, which may differ for each player (e.g., depending on game play, etc.).

Figure 10:
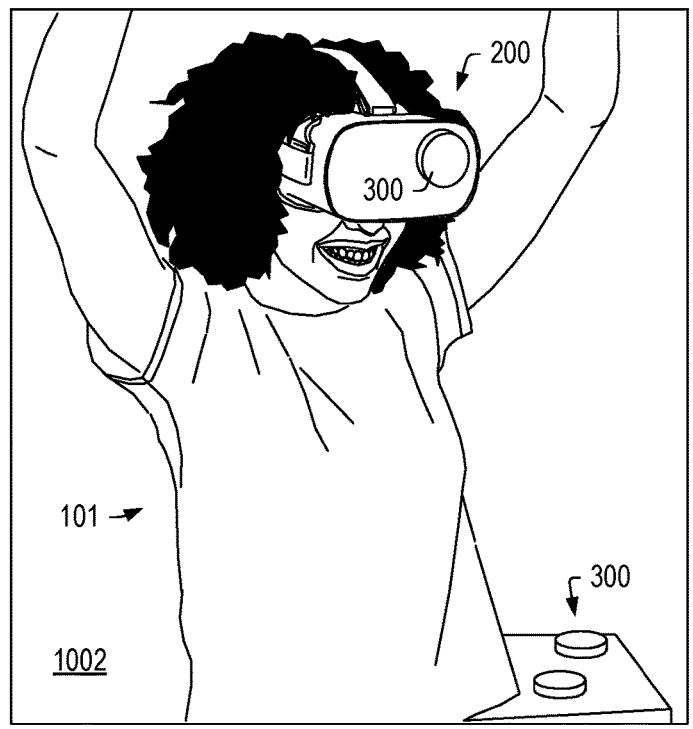
FIG. 10 is a series of diagrams of examples of power units and renderings.
Figure 10:
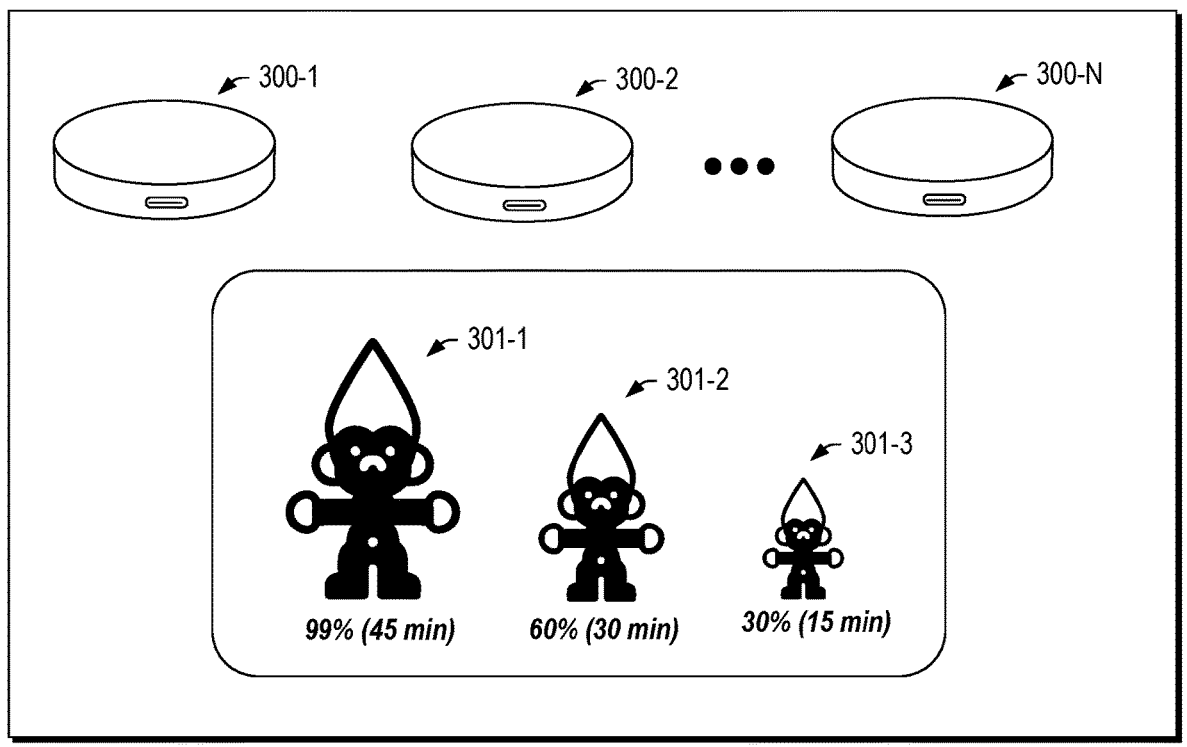

FIG. 10 shows an example scenario 1002 where the user 101 is wearing the VR headset 200 where various power units 300 are in the real-world environment. As shown, each of the power units 300-1, 300-2, . . . , 300-N can be represented in a manner that corresponds to a power state (e.g., power status, etc.). For example, the size of a troll may depend on remaining capacity, time, etc. In such a manner, a user may readily understand which power unit has more remaining capacity, time, etc., for purposes of executing an application using the VR headset 200.

Figure 11:
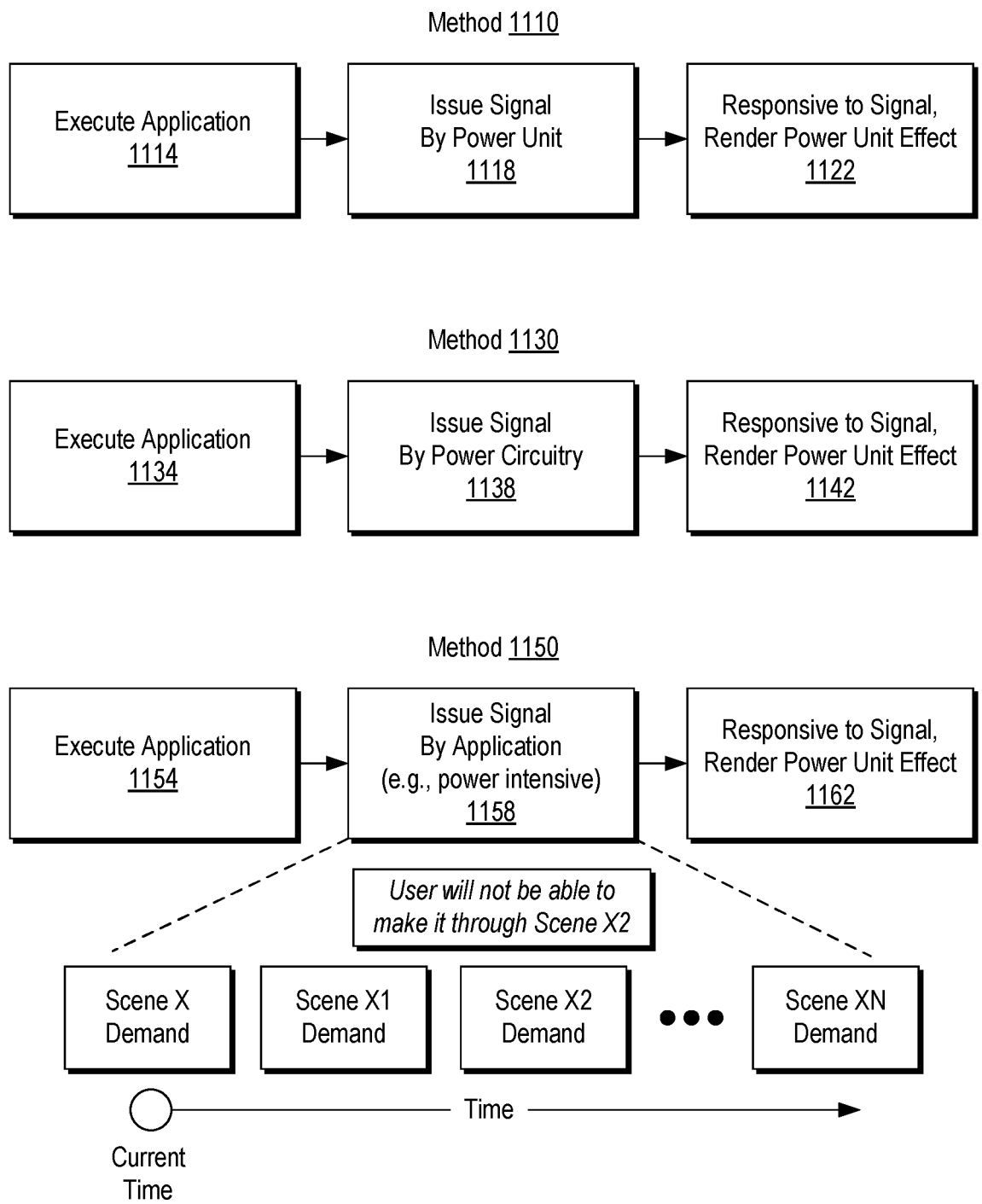
FIG. 11 is a series of diagrams of examples of methods.

FIG. 11 shows various example methods 1110, 1130 and 1150. As shown, the method 1110 includes an execution block 1114 for executing an application, an issuance block 1118 for issuing a signal by a power unit and a render block 1122 for rendering a power unit effect responsive to the signal. As shown, the method 1130 includes an execution block 1134 for executing an application, an issuance block 1138 for issuing a signal by a power circuitry and a render block 1142 for rendering a power unit effect responsive to the signal. As shown, the method 1150 includes an execution block 1154 for executing an application, an issuance block 1158 for issuing a signal by an application, and a render block 1162 for rendering a power unit effect responsive to the signal. As shown, the block 1158 may issue a signal that depends on a determination as to how much further a user may progress in a progressive application for a given power unit. For example, where various scenes are to be rendered (e.g., walking, running, swimming, fighting a giant, etc.), the signal may indicate that a user will not be able to make it through a particular scene unless the current power unit is replaced. In such an example, where a VR headset is aware of a power unit that can be used, the application may integrate that power unit into a scene such that the user's VR experience can continue.

Figure 12:
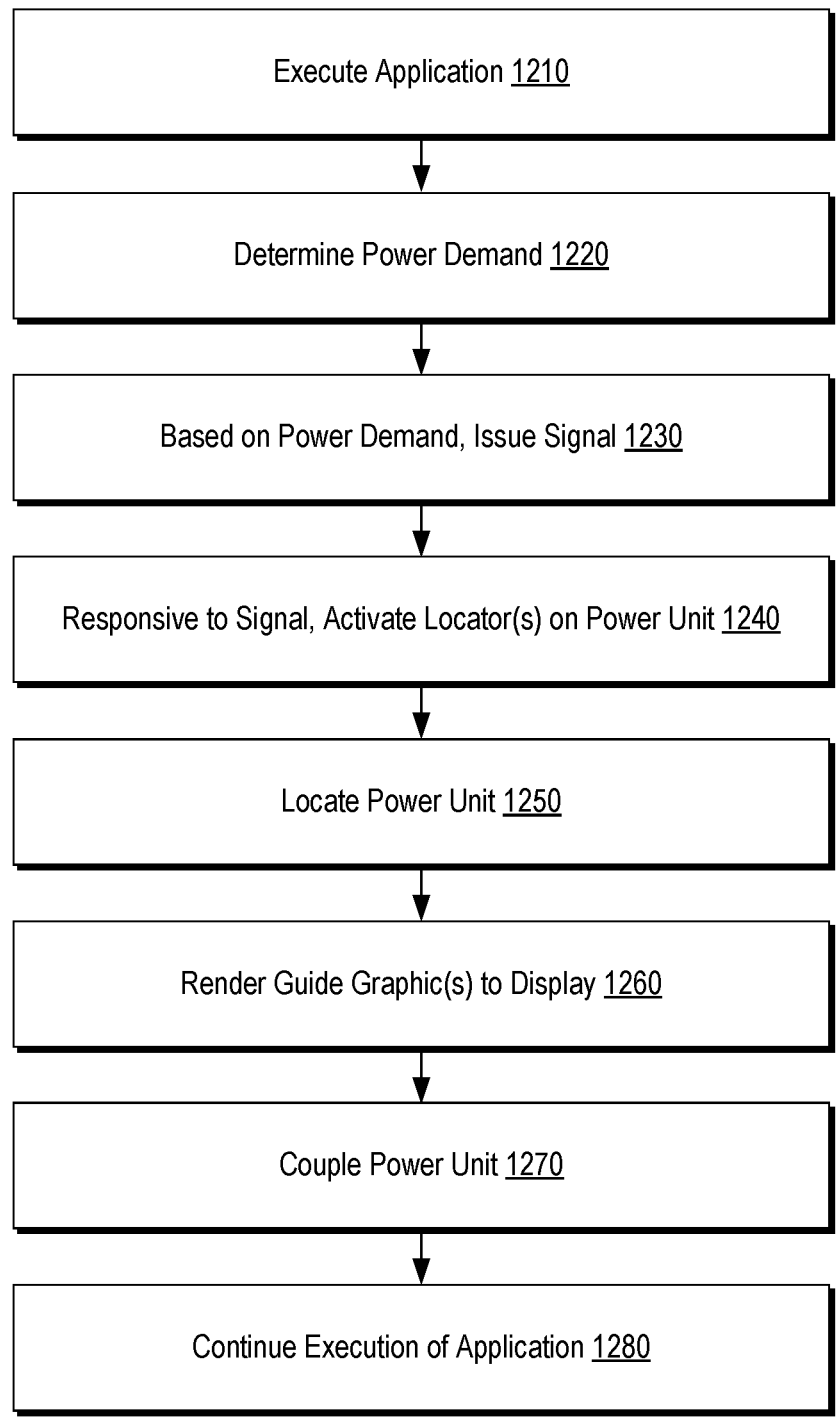
FIG. 12 is a diagram of an example of a method.

FIG. 12 shows an example of a method 1200 that includes an execution block 1210 for executing an application, a determination block 1220 for determining a power demand, an issuance block 1230 for issuing a signal based on the power demand, an activation block 1240 for activating one or more locators on a power unit responsive to the signal, a location block 1250 for locating the power unit, a render block 1260 for rendering one or more guide graphics to a display, a couple block 1270 for coupling the power unit (e.g., as positioned) and a continuation block 1280 for continuing execution of the application.

As an example, one or more actions may be based on execution of an application such as a VR application. As mentioned, various types of integration may be made between a VR application and a power unit or power units that can supply power to a VR headset that can execute such a VR application. As mentioned, integration may provide for a relatively seamless user experience with respect to replenishing power supplied to a VR headset.

Figure 13:
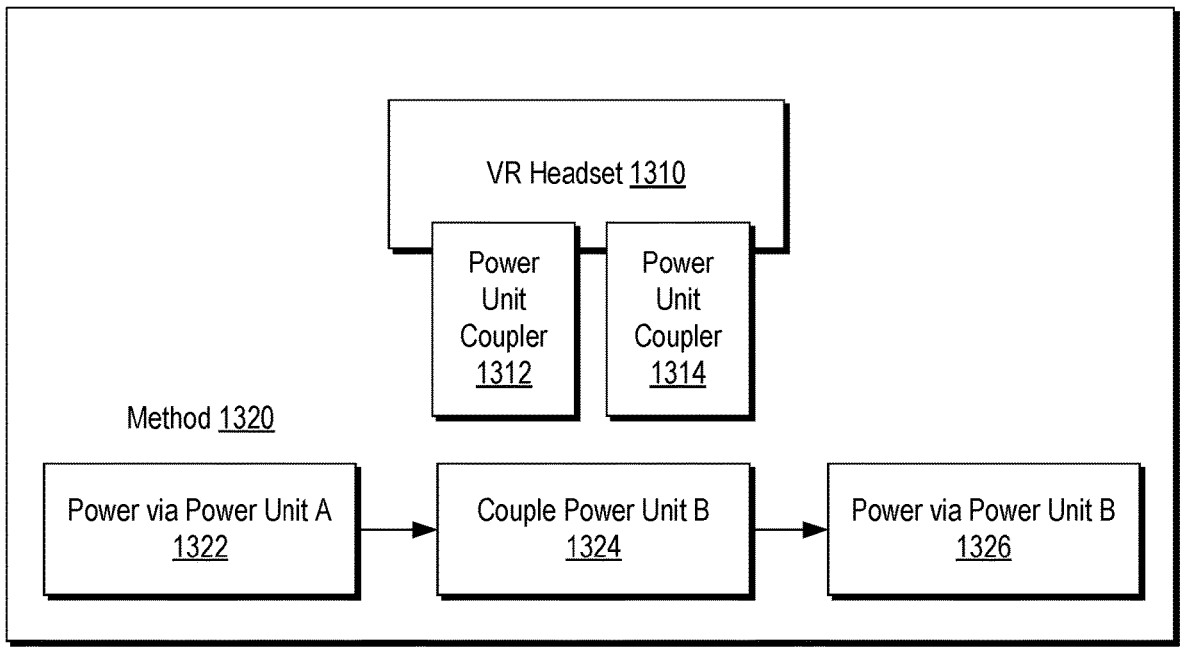
FIG. 13 is a series of diagrams of examples of VR headsets and examples of methods.
Figure 13:
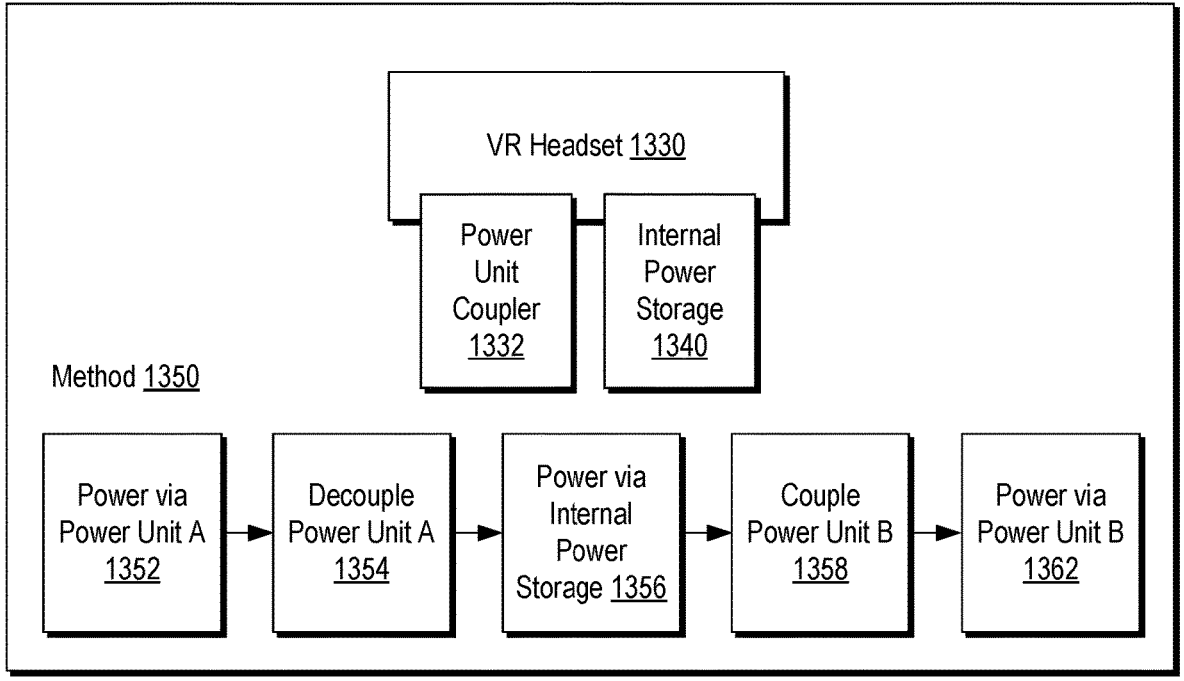

FIG. 13 shows an example of a VR headset 1310 with a power unit coupler 1312 and a power unit coupler 1314 and an example of a VR headset 1330 with a power unit coupler 1332 and an internal power storage 1340. Such examples of VR headsets may allow for continual application execution during coupling of a power unit (e.g., to provide for a relatively seamless user experience, etc.). For example, consider a method 1320 that includes a power block 1322 for powering a VR headset via a power unit A, a coupling block 1324 for coupling a power unit B, and a power block 1326 for powering the VR headset via the power unit B. In such an example, the power unit A and the power unit B may be coupled at the same time such that a gap in supply of power does not occur. As to a method 1350, it includes a power block 1352 for powering the VR headset via a power unit A, a decouple block 1354 for decoupling the power unit A, a power block 1356 for powering the VR headset via an internal power storage, a couple block 1358 for coupling power unit B, and a power block 1362 for powering the VR headset via the power unit B. In such an example, a moment can exist where the VR headset does not have a power unit coupled thereto such that power is supplied via an internal power storage such that a gap does not exist in execution of an application.

Figure 14:
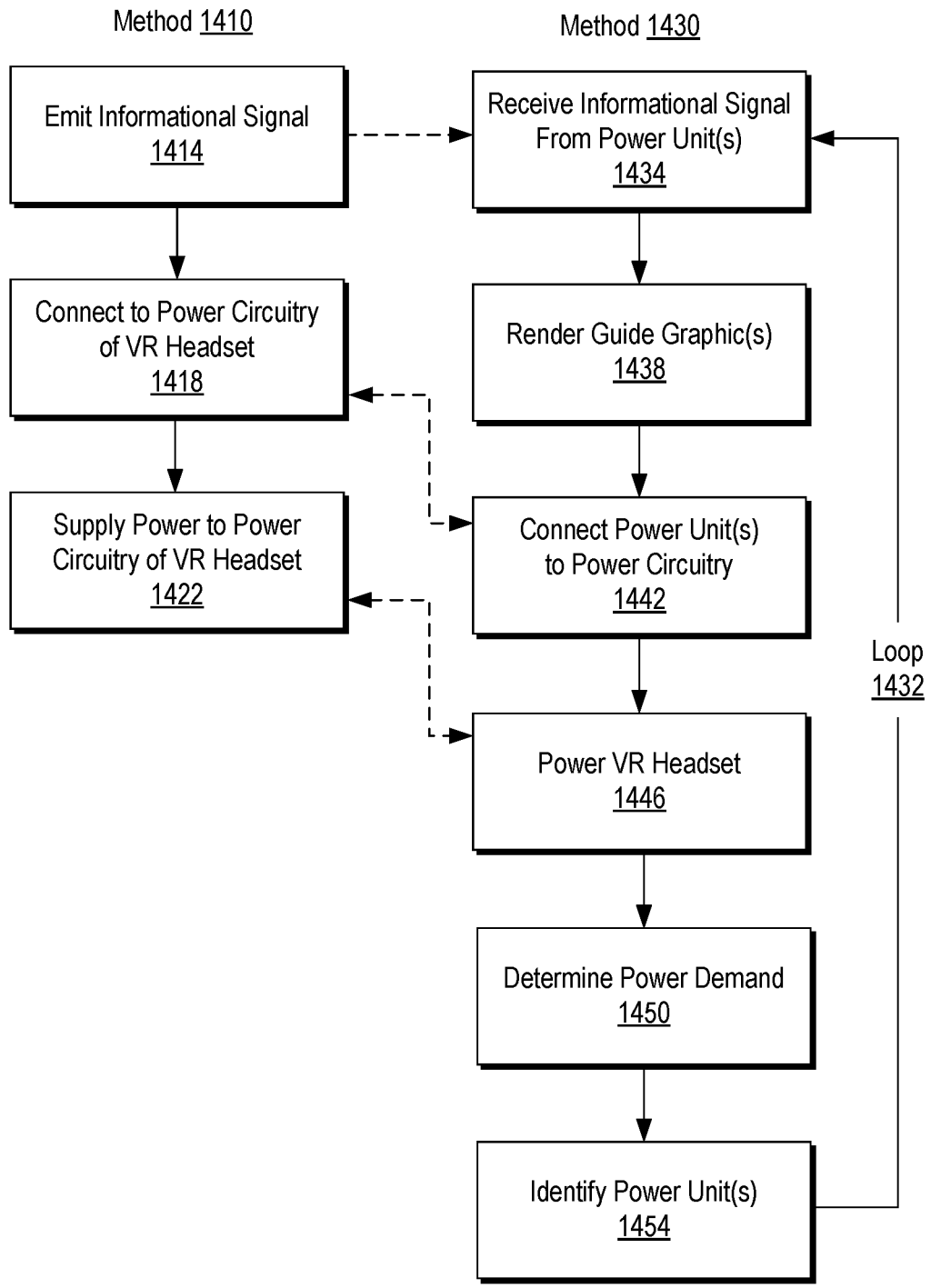
FIG. 14 is a series of diagrams of examples of methods.

FIG. 14 shows example method 1410 and 1430 where the method 1410 can be a power unit method and where the method 1430 can be a VR headset method. As shown, the method 1410 includes an emission block 1414 for emitting an informational signal, a connection block 1418 for connecting to power circuitry of a VR headset, and a supply block 1422 for supplying power to the power circuitry of the VR headset. As shown, the method 1430 includes a reception block 1434 for receiving the informational signal from one or more power units, a render block 1438 for rendering one or more guide graphics to a display, a connection block 1442 for connecting one or more power units to power circuitry, a power block 1446 for powering a VR headset using the power circuitry, a determination block 1450 for determining a power demand, and an identification block 1454 for identifying one or more power units based at least in part on the power demand (e.g., a power unit that can meet the power demand, which may be, for example, associated with a scene, a length of game play, etc.). As shown, the method 1430 can include a loop 1432 where the identification block 1454 may operate with the reception block 1434 such that the render block 1438 can render one or more appropriate graphics (e.g., to guide a user to a suitable power unit, etc.).

As an example, a method can include executing an application using a virtual reality headset; rendering a scene of the application to a display of the virtual reality headset; and during rendering of the scene, rendering a graphic to the display where the graphic represents a power unit that is not physically coupled to the virtual reality headset. In such an example, the graphic can represent a power state of the power unit, represents a location of the power unit, represent the power unit and simultaneously represent an object of the scene (e.g., consider the object of the scene being a game object).

As mentioned with respect to FIG. 9, a graphic may be an animation, an effect, etc. As an example, a graphic may be rendered along with one or more other sensory effects (e.g., sound, vibration, electrical shock, etc.). As to sound, a power unit may include a speaker, a VR headset, and/or an accessory can include a speaker. As to a vibration, a power unit, a VR headset, and/or an accessory can include a vibrator. As to an electrical shock, a power unit may include surface circuitry that can cause a static electricity level type of "shock" or sensation to a user that touches the power unit (e.g., to "feel the power"). In such an example, an electrical shock effect may be controllable and optionally integrated into game play where such an effect may encourage, deter, etc., a user from handling the power unit (e.g., depending on game play of an application, etc.).

As an example, a method can include receiving a signal from a power unit. For example, consider a location signal, a power state signal, an orientation signal, a touch signal, etc. As an example, such receiving may be responsive to transmitting a signal to the power unit (e.g., a ping, a wake-up call, a status check, an instruction, etc.).

As an example, a method can include rendering a graphic to a display in a manner that is responsive to determining time remaining for executing an application using a current power supply. For example, consider the current power supply being provided via a power unit physically coupled to a virtual reality headset.

As an example, one or more computer-readable media can include processor-executable instructions, executable to: execute an application using a virtual reality headset; render a scene of the application to a display of the virtual reality headset; and render a graphic to the display, in the scene, where the graphic represents a power unit that is not physically coupled to the virtual reality headset.

As an example, a system can include a virtual reality headset that includes a display, power unit locating circuitry, and a power unit coupling, where the virtual reality headset renders one or more graphics to the display based on output of the power unit locating circuitry; and a plurality of power units. In such an example, each of the plurality of power units can be coupled to (e.g., couples to) the power unit coupling of the virtual reality headset in multiple orientations. For example, consider multiple orientations that include different rotational orientations about a power unit coupling axis.

As an example, each of a plurality of power units can include at least one metal-cell battery. For example, consider a lithium-ion cell, a zinc cell, a magnesium cell, a lead cell, etc. As an example, a power unit can include a hydrogen cell. As an example, a power unit can include one or more types of chemicals that can generate a potential such that the power unit can provide electrical power (e.g., energy) to at least circuitry of a VR headset. As mentioned, a power unit can include circuitry, which may be powered via one or more cells of the power unit. As an example, a power unit can be an assembly, which may include, for example, a housing that can house one or more cells (e.g., one or more lithium-ion cells, etc.).

As an example, power unit locating circuitry can include at least one electromagnetic energy detector and, for example, at least one electromagnetic energy emitter. In the example of FIG. 2, the VR headset circuitry 208 can include power unit locating circuitry. For example, consider the orientation circuitry 250, the visible and/or IR circuitry 260, the communication circuitry 280, and/or the other circuitry 290. As an example, each of a plurality of power units can include at least one electromagnetic energy emitter and/or reflector. As an example, a power unit can include one or more of a reflector, an emitter, and a detector.

As an example, a power unit coupling of a virtual reality headset can be disposed on an external surface of the virtual reality headset. In such an example, the power unit coupling can be accessible by a user wearing the virtual reality headset without the user removing the virtual reality headset. For example, the user may be guided within a virtual environment in positioning a power unit such that the power unit is operatively coupled to the power unit coupling of the virtual headset.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 15:
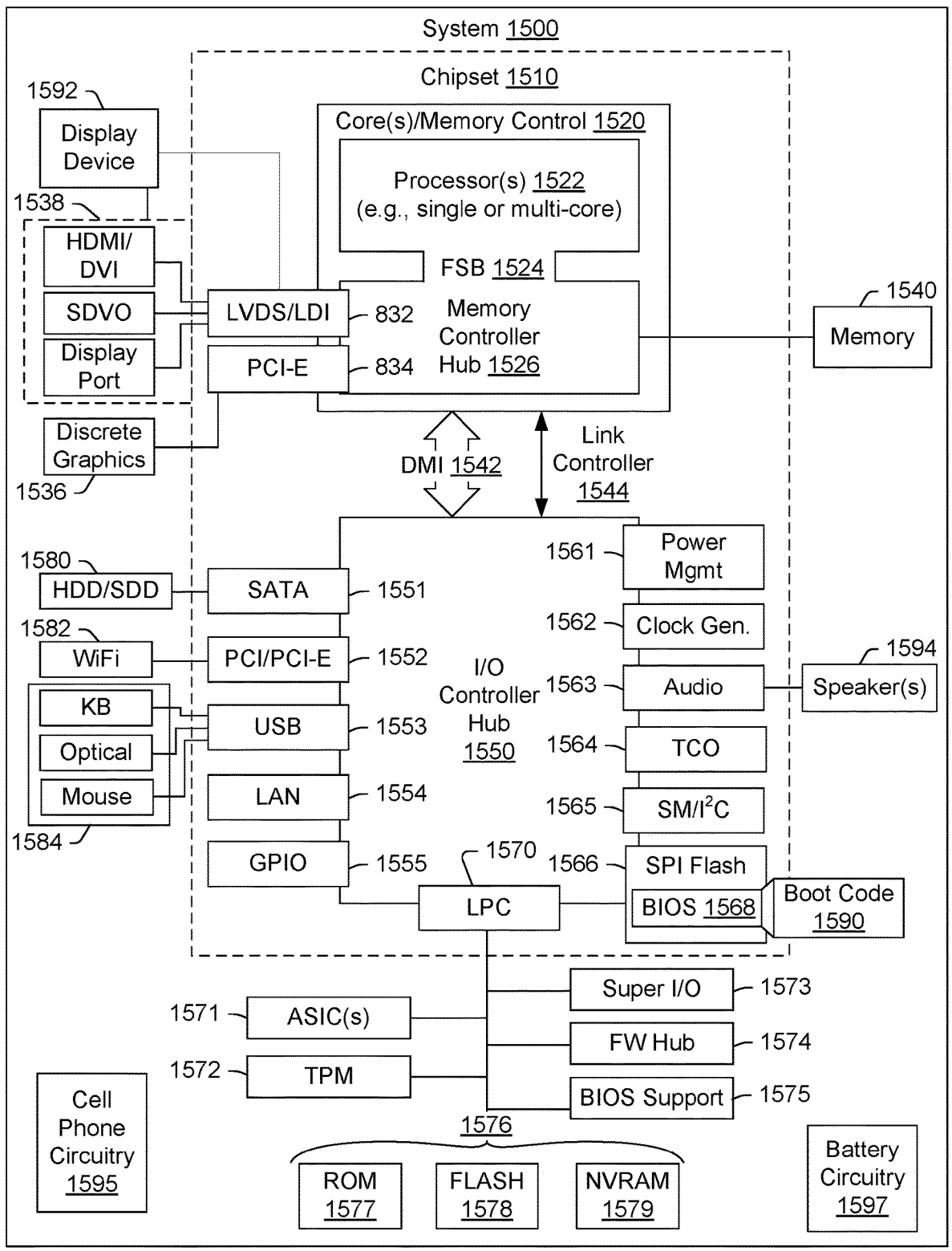
FIG. 15 is a diagram of an example of a system that includes one or more processors.

While various examples of circuits or circuitry have been discussed, FIG. 15 depicts a block diagram of an illustrative computer system 1500. The system 1500 may be a desktop computer system, such as one of the THINKCENTRE® or THINKPAD® series of personal computers sold by Lenovo (US) Inc. of Morrisville, N.C., or a workstation computer, such as the THINKSTATION®, which are sold by Lenovo (US) Inc. of Morrisville, N.C.; however, as apparent from the description herein, a satellite, a base, a server or other machine may include other features or only some of the features of the system 1500. As described herein, a device, such as, for example, the device 200, may include at least some of the features of the system 1500. As an example, a power unit, such as, for example, the power unit 300, may include one or more features of the system 1500.

As shown in FIG. 15, the system 1500 includes a so-called chipset 1510. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 15, the chipset 1510 has a particular architecture, which may vary to some extent depending on brand or manufacturer. The architecture of the chipset 1510 includes a core and memory control group 1520 and an I/O controller hub 1550 that exchange information (e.g., data, signals, commands, etc.) via, for example, a direct management interface or direct media interface (DMI) 1542 or a link controller 1544. In the example of FIG. 15, the DMI 1542 is a chip-to-chip interface (sometimes referred to as being a link between a "northbridge" and a "southbridge").

The core and memory control group 1520 include one or more processors 1522 (e.g., single core or multi-core) and a memory controller hub 1526 that exchange information via a front side bus (FSB) 1524. As described herein, various components of the core and memory control group 1520 may be integrated onto a single processor die, for example, to make a chip that supplants the conventional "northbridge" style architecture.

The memory controller hub 1526 interfaces with memory 1540. For example, the memory controller hub 1526 may provide support for DDR SDRAM memory (e.g., DDR, DDR2, DDR3, etc.). In general, the memory 1540 is a type of random-access memory (RAM). It is often referred to as "system memory".

The memory controller hub 1526 further includes a low-voltage differential signaling interface (LVDS) 1532. The LVDS 1532 may be a so-called LVDS Display Interface (LDI) for support of a display device 1592 (e.g., a CRT, a flat panel, a projector, etc.). A block 1538 includes some examples of technologies that may be supported via the LVDS interface 1532 (e.g., serial digital video, HDMI/DVI, display port). The memory controller hub 1526 also includes one or more PCI-express interfaces (PCI-E) 1534, for example, for support of discrete graphics 1536. Discrete graphics using a PCI-E interface has become an alternative approach to an accelerated graphics port (AGP). For example, the memory controller hub 1526 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1550 includes a variety of interfaces. The example of FIG. 15 includes a SATA interface 1551, one or more PCI-E interfaces 1552 (optionally one or more legacy PCI interfaces), one or more USB interfaces 1553, a LAN interface 1554 (more generally a network interface), a general purpose I/O interface (GPIO) 1555, a low-pin count (LPC) interface 1570, a power management interface 1561, a clock generator interface 1562, an audio interface 1563 (e.g., for speakers 1594), a total cost of operation (TCO) interface 1564, a system management bus interface (e.g., a multi-master serial computer bus interface) 1565, and a serial peripheral flash memory/controller interface (SPI Flash) 1566, which, in the example of FIG. 15, includes BIOS 1568 and boot code 1590. With respect to network connections, the I/O hub controller 1550 may include integrated gigabit Ethernet controller lines multiplexed with a PCI-E interface port. Other network features may operate independent of a PCI-E interface.

The interfaces of the I/O hub controller 1550 provide for communication with various devices, networks, etc. For example, the SATA interface 1551 provides for reading, writing or reading and writing information on one or more drives 1580 such as HDDs, SDDs or a combination thereof. The I/O hub controller 1550 may also include an advanced host controller interface (AHCI) to support one or more drives 1580. The PCI-E interface 1552 allows for wireless connections 1582 to devices, networks, etc. The USB interface 1553 provides for input devices 1584 such as keyboards (KB), one or more optical sensors, mice and various other devices (e.g., microphones, cameras, phones, storage, media players, etc.). On or more other types of sensors may optionally rely on the USB interface 1553 or another interface (e.g., $I^2C$, etc.). As to microphones, the system 1500 of FIG. 15 may include hardware (e.g., audio card) appropriately configured for receipt of sound (e.g., user voice, ambient sound, etc.).

In the example of FIG. 15, the LPC interface 1570 provides for use of one or more ASICs 1571, a trusted platform module (TPM) 1572, a super I/O 1573, a firmware hub 1574, BIOS support 1575 as well as various types of memory 1576 such as ROM 1577, Flash 1578, and non-volatile RAM (NVRAM) 1579. With respect to the TPM 1572, this module may be in the form of a chip that can be used to authenticate software and hardware devices. For example, a TPM may be capable of performing platform authentication and may be used to verify that a system seeking access is the expected system.

The system 1500, upon power on, may be configured to execute boot code 1590 for the BIOS 1568, as stored within the SPI Flash 1566, and thereafter processes data under the control of one or more operating systems and application software (e.g., stored in system memory 1540). An operating system may be stored in any of a variety of locations and accessed, for example, according to instructions of the BIOS 1568. Again, as described herein, a satellite, a base, a server or other machine may include fewer or more features than shown in the system 1500 of FIG. 15. Further, the system 1500 of FIG. 15 is shown as optionally include cell phone circuitry 1595, which may include GSM, CDMA, etc., types of circuitry configured for coordinated operation with one or more of the other features of the system 1500. Also shown in FIG. 15 is battery circuitry 1597, which may provide one or more battery, power, etc., associated features (e.g., optionally to instruct one or more other components of the system 1500). As an example, a SMBus may be operable via a LPC (see, e.g., the LPC interface 1570), via an I²C interface (see, e.g., the SM/I²C interface 1565), etc.

Conclusion

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   executing an application using a virtual reality headset;
   rendering a scene of the application to a display of the virtual reality headset; and
   during rendering of the scene, rendering a graphic to the display wherein the graphic represents a power unit that is not physically coupled to the virtual reality headset.

2. The method of claim 1, wherein the graphic represents a power state of the power unit.

3. The method of claim 1, wherein the graphic represents a location of the power unit.

4. The method of claim 1, wherein the graphic represents the power unit and simultaneously represents an object of the scene.

5. The method of claim 4, wherein the object of the scene is a game object.

6. The method of claim 1, comprising receiving a signal from the power unit.

7. The method of claim 6, wherein the signal is a location signal.

8. The method of claim 6, wherein the signal is a power state signal.

9. The method of claim 6, wherein the receiving is responsive to transmitting a signal to the power unit.

10. The method of claim 1, wherein rendering the graphic to the display is responsive to determining time remaining for the executing of the application using a current power supply.

11. The method of claim 10, wherein the current power supply is via a power unit physically coupled to the virtual reality headset.

12. One or more computer-readable media comprising processor-executable instructions, executable to:
    execute an application using a virtual reality headset;
    render a scene of the application to a display of the virtual reality headset; and
    render a graphic to the display, in the scene, wherein the graphic represents a power unit that is not physically coupled to the virtual reality headset.

13. A system comprising:
    a virtual reality headset that comprises a display, power unit locating circuitry, and a power unit coupling, wherein the virtual reality headset renders one or more graphics to the display based on output of the power unit locating circuitry; and
    a plurality of power units.

14. The system of claim 13, wherein each of the plurality of power units couples to the power unit coupling of the virtual reality headset in multiple orientations.

15. The system of claim 14, wherein the multiple orientations comprise different rotational orientations about a power unit coupling axis.

16. The system of claim 13, wherein each of the plurality of power units comprises at least one lithium-ion cell.

17. The system of claim 13, wherein the power unit locating circuitry comprises at least one electromagnetic energy detector.

18. The system of claim 17, wherein the power unit locating circuitry comprises at least one electromagnetic energy emitter.

19. The system of claim 17, wherein each of the plurality of power units comprises at least one electromagnetic energy emitter.

20. The system of claim 13, wherein the power unit coupling is disposed on an external surface of the virtual reality headset.

* * * * *